United States Patent [19]

Tanaka et al.

[11] Patent Number: 5,551,231
[45] Date of Patent: Sep. 3, 1996

[54] ENGINE EXHAUST GAS PURIFICATION DEVICE

[75] Inventors: Hiroshi Tanaka, Susono; Takaaki Itou; Keiso Takeda, both of Mishima; Hidemi Ohnaka, Susono; Kazuhisa Kunitake, Susono; Toshio Tanahashi, Susono, all of Japan

[73] Assignee: Toyota Jidosha Kabushiki Kaisha, Toyota, Japan

[21] Appl. No.: 344,768

[22] Filed: Nov. 23, 1994

[30] Foreign Application Priority Data

Nov. 25, 1993 [JP] Japan ................................. 5-295268

[51] Int. Cl.$^6$ ............................................. F01N 3/22
[52] U.S. Cl. ................... 60/289; 60/297; 60/301
[58] Field of Search ............................ 60/289, 301, 297

[56] References Cited

U.S. PATENT DOCUMENTS

| | | | |
|---|---|---|---|
| 5,235,956 | 8/1993 | Yoshizaki | 60/289 |
| 5,388,406 | 2/1995 | Takeshima et al. | 60/297 |
| 5,433,074 | 7/1995 | Seto et al. | 60/297 |

FOREIGN PATENT DOCUMENTS

| | | |
|---|---|---|
| 61-134515 U | 8/1986 | Japan . |
| 62-97630A | 5/1987 | Japan . |
| 62-106826A | 5/1987 | Japan . |
| 62-117620A | 5/1987 | Japan . |
| 1203609A | 8/1989 | Japan . |
| 374515A | 3/1991 | Japan . |
| 3135417A | 6/1991 | Japan . |
| 3217640A | 9/1991 | Japan . |
| 4262016A | 9/1992 | Japan . |
| WO93/07363 | 4/1993 | WIPO . |

OTHER PUBLICATIONS

"NO Removal by Absorption into BaO–CuO Binary Oxides" (J. Chem. Soc., Chem. Commun., pp. 1165–1166) (1990).

"Formation and Decomposition of $BaCuO_{2.5}$ Prepared from a Mixture of Nitrates" (Journal of Solid State Chemistry, pp. 176–179) (1991).

"NO Removal by Absoprtion into Ba–Cu –O Binary Oxides" (Catalyst vol. 33, No. 2, pp. 87–90) (1991).

*Primary Examiner*—Douglas Hart
*Attorney, Agent, or Firm*—Kenyon & Kenyon

[57] ABSTRACT

An exhaust gas purification device comprising a three way catalyst, an oxidizing catalyst and a NOx absorbent which are arranged in this order in the exhaust passage. A rich air-fuel mixture is burned in the combustion chamber, and secondary air is supplied upstream of the three way catalyst so as to make the air-fuel ratio of the exhaust gas flowing into the three way catalyst a rich air-fuel ratio greater than the air-fuel ratio of the air-fuel mixture burned in the combustion chamber. Further, secondary air is supplied upstream of the oxidizing catalyst to make the air-fuel ratio of the exhaust gas flowing into the oxidizing catalyst and the NOx absorbent slightly leaner than the stoichiometric air-fuel ratio.

25 Claims, 19 Drawing Sheets

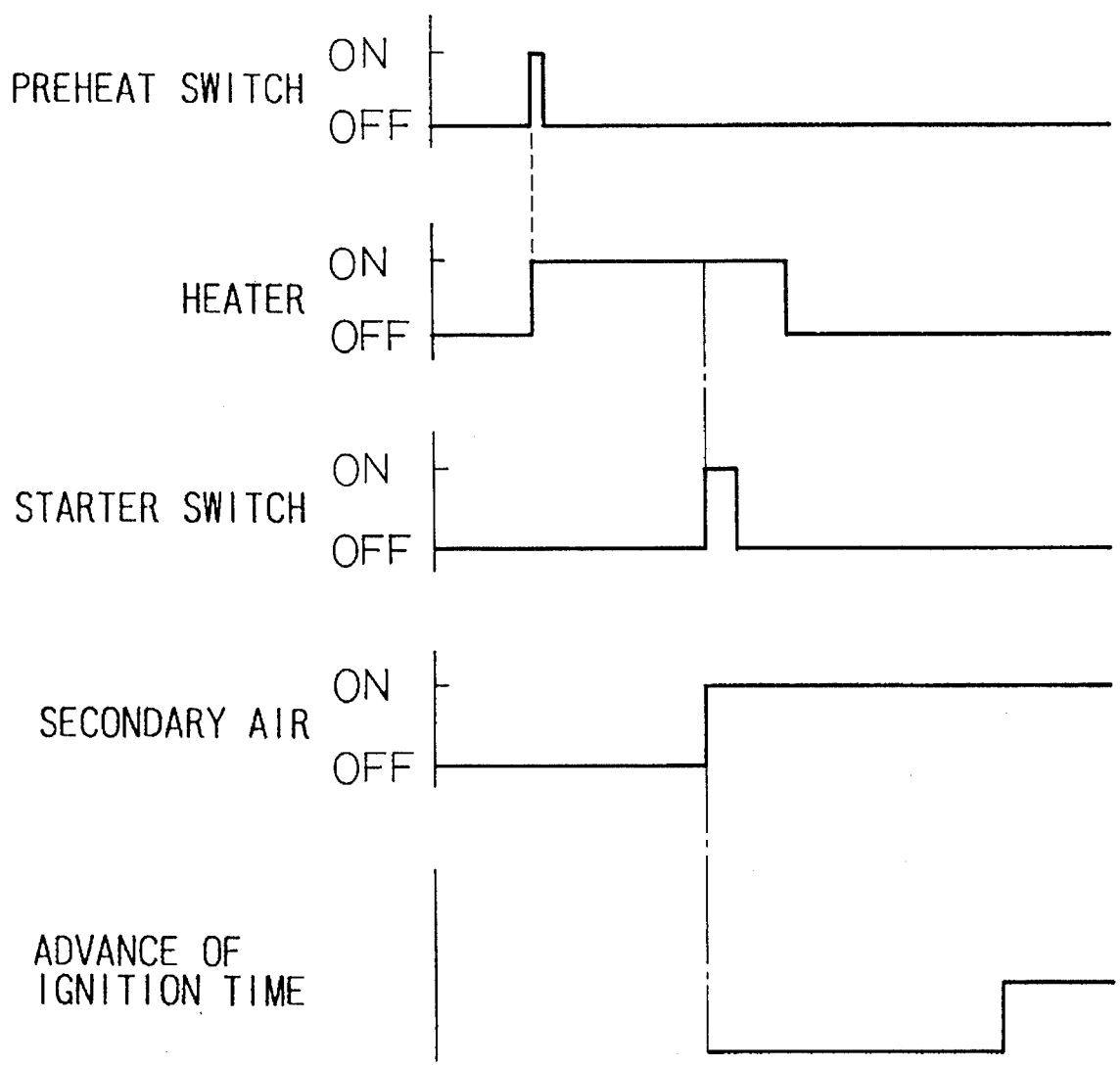

ENGINE EXHAUST GAS PURIFICATION DEVICE

BACKGROUND OF THE INVENTION

1. Field of the Invention

The present invention relates to an engine exhaust gas purification device.

2. Description of the Related Art

If a ratio of the total amount of air fed into the exhaust passage upstream of a certain position in the exhaust passage, the combustion chamber, and the intake passage to the total amount of fuel is referred to as an air-fuel ratio of the exhaust gas at that certain position, there is known an engine in which a lean air-fuel mixture is burned in the combustion chamber, a three way catalyst is arranged in the exhaust passage, and a NOx absorbent, which absorbs NOx when the air-fuel ratio of the exhaust gas flowing into the NOx absorbent is lean and releases absorbed NOx when the air-fuel ratio of the exhaust gas flowing into the NOx absorbent is rich, is arranged in the exhaust passage downstream of the three way catalyst (see PCT international publication WO93/07363).

Namely, in this engine, the amount of production of NOx becomes maximum when an air-fuel mixture which is slightly leaner than the stoichiometric air-fuel ratio is burned, and the amount of production of NOx becomes smaller as the air-fuel ratio is made leaner or richer with respect to the air-fuel ratio of this air-fuel mixture. In addition, when a lean air-fuel mixture is burned, the amount of unburned HC and CO discharged from the engine becomes considerably small, as compared with the case where a rich air-fuel mixture is burned. Accordingly, in the above-mentioned engine, the air-fuel ratio of the air-fuel mixture to be burned in the combustion chamber is made considerably lean to reduce the amount of NOx and unburned HC and CO discharged from the engine as much as possible. In addition, at this time, the NOx discharged from the engine is caused to be absorbed by the NOx absorbent as much as possible, and the unburned HC and CO discharged from the engine are caused to be oxidized by the three way catalyst as much as possible to reduce the amount of NOx and unburned HC and CO discharged into the outside air.

Among the harmful components in the exhaust gas, NOx is a component which is the most difficult to deal with. If this NOx can be reduced by the three way catalyst, it is possible to considerably lower the amount of NOx in the exhaust gas. However, if the air-fuel ratio of the exhaust gas is lean, the three way catalyst does not carry out the reducing operation of NOx. Accordingly, if the air-fuel ratio of air-fuel mixture is made lean, i.e., the air-fuel ratio of the exhaust gas is made lean as in the above-mentioned engine, NOx discharged from the engine is not reduced by the three way catalyst and, accordingly, in the above-mentioned engine, NOx passes through the three way catalyst without being reduced and then flows into the NOx absorbent.

Namely, in the above-mentioned engine, the first stage of the reducing operation of the amount of NOx is carried out by making the air-fuel ratio of the air-fuel mixture lean. In this case, it is true that the amount of NOx discharged from the engine is reduced due to this first stage of the reducing operation of the amount of NOx, but the absolute amount of NOx discharged from the engine is still large. Although NOx discharged from the engine flows into the three way catalyst, the amount of NOx is not reduced in the three way catalyst at all. The NOx flows into the NOx absorbent, and the second stage of the reducing operation of the amount of NOx is carried out therein by the absorbing operation of NOx by the NOx absorbent.

In this way, in this engine, the reducing operation of NOx is carried out in two stages, but the main reducing operation of the amount of NOx relies on the absorbing operation of NOx by the NOx absorbent. However, even if the NOx absorbent is used, particularly when the absolute amount of NOx flowing into the NOx absorbent is large, all the NOx cannot always be absorbed in the NOx absorbent. Accordingly, it is difficult to make the amount of NOx, discharged into the outside air, almost zero as long as the main reducing operation of NOx is made to rely on only the absorbing operation of NOx by the NOx absorbent.

SUMMARY OF THE INVENTION

An object of the present invention is to provide an exhaust gas purification device capable of making the amount of NOx, discharged into the atmosphere, almost zero.

According to the present invention, there is provided an engine exhaust gas purification device, comprising air-fuel mixture control means for making an air-fuel mixture burned in a combustion chamber of the engine a rich air-fuel mixture; a three way catalyst arranged in an exhaust passage of the engine; a NOx absorbent arranged in the exhaust passage downstream of the three way catalyst, the NOx absorbent absorbing NOx therein when an air-fuel ratio of exhaust gas flowing into the NOx absorbent is lean; first secondary air supply means for feeding secondary air into the exhaust passage upstream of the three way catalyst; second secondary air supply means for feeding secondary air into the exhaust passage between the three way catalyst and the NOx absorbent; and secondary air control means for controlling amounts of secondary air fed from the first secondary air supply means and the second secondary air supply means to maintain the air-fuel ratio of the exhaust gas flowing into the three way catalyst at a rich air-fuel ratio which is larger than an air-fuel ratio of the rich air-fuel mixture and to maintain the air-fuel ratio of the exhaust gas flowing into the NOx absorbent at a lean air-fuel ratio.

The present invention may be more fully understood from the description of preferred embodiments of the invention set forth below together with the accompanying drawings.

BRIEF DESCRIPTION OF THE DRAWINGS

In the drawings,

FIG. 11 is a time chart illustrating the control of the electrical heating operation, etc., at the time of the start of the engine;

DESCRIPTION OF PREFERRED EMBODIMENTS

Figure 1:
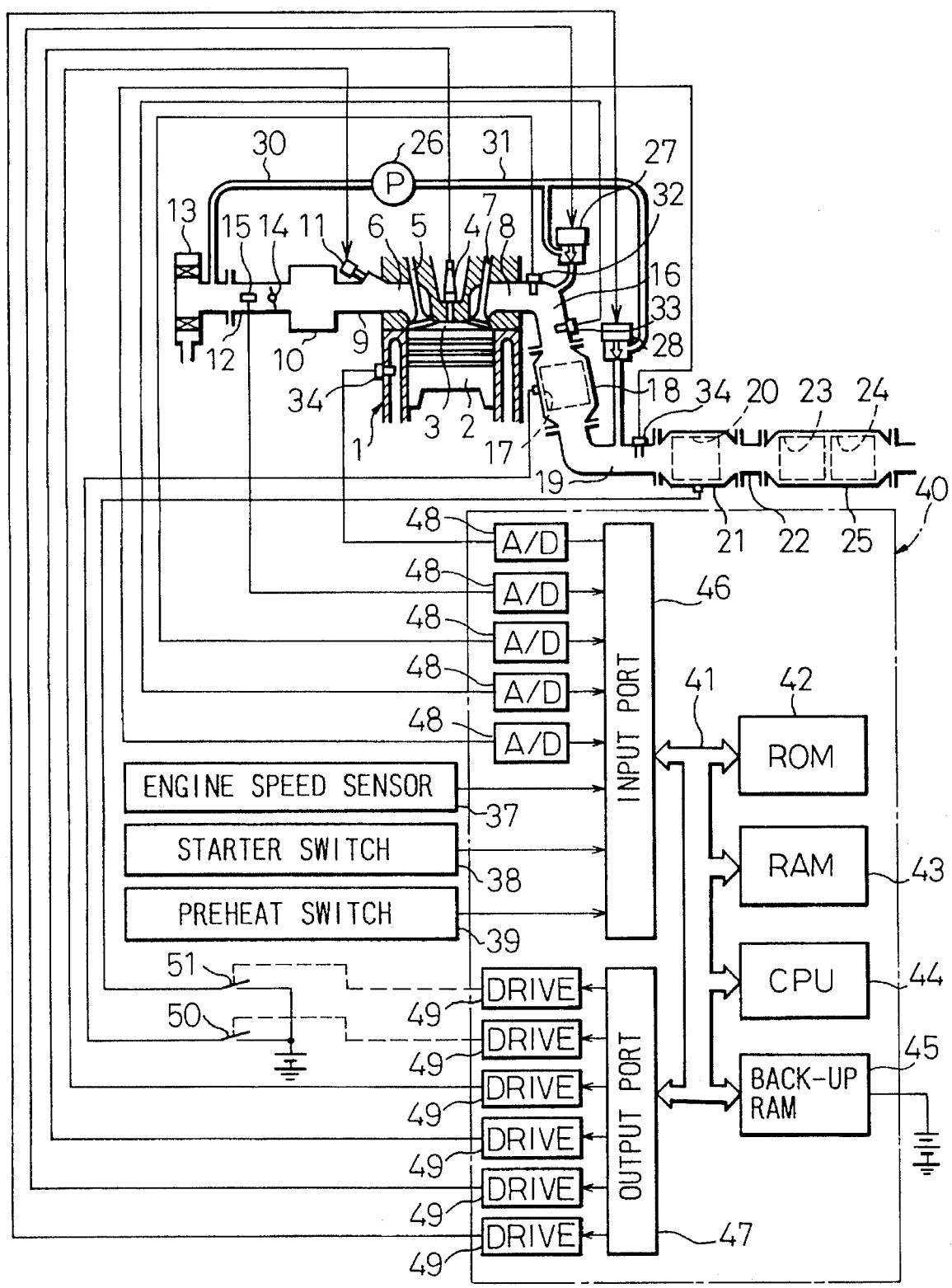
FIG. 1 is a general view of an engine.

Referring to FIG. 1, reference numeral 1 designates an engine body, 2 a piston, 3 a combustion chamber, and 4 a spark plug; 5 designates an intake valve, 6 an intake port, 7 an exhaust valve, and 8 an exhaust port. The intake ports 6 are connected to a surge tank 10 via corresponding intake branch pipes 9, and fuel injectors 11 are arranged in the intake branch pipes 9 to inject fuel toward the corresponding intake ports 6. The surge tank 10 is connected to an air cleaner 13 via an intake duct 12, and a throttle valve 14 is arranged in the intake duct 12. In addition, a mass flow detector 15 which is able to detect the mass flow amount of air fed into the engine cylinders is arranged in the intake duct 12 upstream of the throttle valve 14.

The exhaust ports 8 are connected, via an exhaust manifold 16, to a catalytic converter 18 including an electrically heated three way catalyst 17 therein, and the outlet of the catalytic converter 18 is connected, via an exhaust pipe 19, to a catalytic converter 21 including an electrically heated oxidizing catalyst 20 therein. In addition, the outlet of the catalytic converter 21 is connected, via an exhaust pipe 22, to a casing 25 including a pair of NOx absorbents 23, 24 therein.

As illustrated in FIG. 1, the engine has an air pump 26 driven by the engine or an electric motor, a first secondary air supply valve 27, and a second secondary air supply valve 28. The air suction port of the air pump 26 is connected to the intake passage located between the air cleaner 13 and the mass flow detector 15 via a conduit 30. Conversely, the air discharge port of the air pump 26 is connected, on the one hand, to the exhaust manifold 16 via a conduit 31 and the first secondary air supply valve 27 and, on the other hand, to the exhaust pipe 19 via the conduit 31 and the second secondary air supply valve 28. In addition, a first air-fuel ratio sensor 32 is arranged in the exhaust manifold 16 upstream of the inlet of secondary air flowing from the first secondary air supply valve 27, a second air-fuel ratio sensor 33 is arranged in the exhaust manifold 16 downstream of the inlet of air from the first secondary air supply valve 27, and a third air-fuel ratio sensor 34 is arranged in the exhaust pipe 19 downstream of the inlet of air flowing from the second secondary air supply valve 28. Furthermore, a temperature sensor 35 is attached to the engine body 1.

Figure 2:
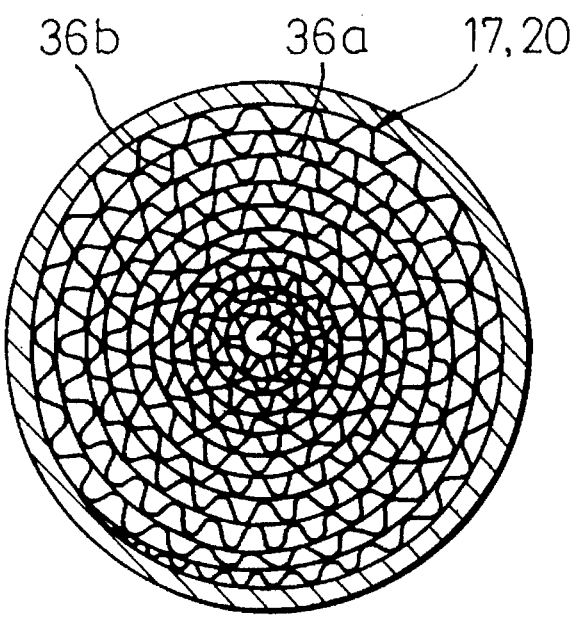
FIG. 2 is a cross-sectional view of the electrically heated three way catalyst and the electrically heated oxidizing catalyst.

Both the electrically heated three way catalyst 17 and the electrically heated oxidizing catalyst 20 have a construction such that, for example, a metallic thin plate 36a and a metallic corrugated plate 36b are alternately wound about a common axis as illustrated in FIG. 2, and catalytic particles are carried on the metallic thin plate 36a and the metallic corrugated plate 36b. In addition, by causing electric current to flow within the metallic thin plate 36a and the metallic corrugated plate 36b, these plates 36a and 36b are made to give off heat, and thus the catalytic particles carried on these plates 36a and 36b are heated. Accordingly, the metallic thin plate 36a and the metallic corrugated plate 36b construct a carrier for the catalyst and, at the same time, function as a heater. This heater is controlled by signals output from an electronic control unit 40.

Figure 3:
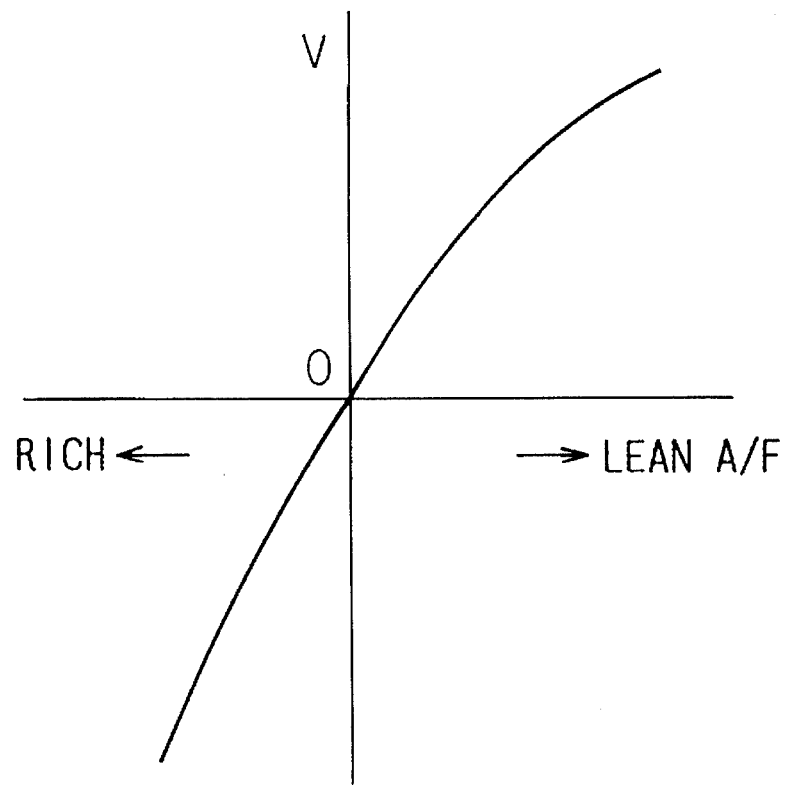
FIG. 3 is a diagram illustrating the output of the air-fuel ratio sensor.

The electronic control unit 40 is constructed as a digital computer and comprises a ROM (read only memory) 42, a RAM (random access memory) 43, a CPU (microprocessor etc.) 44, a back-up RAM 45 continuously connected to the power source, an input port 46, and an output port 47 connected to each other by the bidirectional bus 41. The mass flow detector 15 produces an output voltage which is proportional to the mass flow amount of air fed into the engine cylinders, and this output voltage is input into the input port 46 via a corresponding AD converter 48. In addition, the air-fuel ratio sensors 32, 33, and 34 produce an output voltage V which corresponds to the air-fuel ratio of exhaust gas A/F, as illustrated in FIG. 3, and thus the air-fuel ratio of exhaust gas A/F can be found from the output voltage V. The output voltages V of the air-fuel ratio sensors are input into the input port 46 via corresponding AD converters 48. The temperature sensor 35 produces an output voltage which is proportional to the temperature of the cooling water of the engine, and this output voltage is input into the input port 46 via a corresponding AD converter 48.

An engine speed sensor 37 which produces output pulses representing the engine speed is connected to the input port 46 and, in addition, the operation signal of a starter switch 38 for driving the starter motor is input into the input port 46. Furthermore, the operation signals of a preheat switch 39 for controlling the supply of power to the electrically heated three way catalyst 17 and the electrically heated oxidizing catalyst 20 are input into the input port 46.

The output port 47 is connected, via corresponding drive circuits 49, to a spark plug 4, fuel injectors 11, a relay 50 for controlling the supply of power to the electrically heated three way catalyst 17, a relay 51 for controlling the supply of power to the electrically heated oxidizing catalyst 20, and the secondary air supply valves 27 and 28. The secondary air supply valves 27 and 28 are controlled in the ratio of the time period of opening per a unit time, i.e., in the duty ratio. The amounts of secondary air fed into the exhaust manifold 16 and the exhaust pipe 19 from the secondary air supply valves 27 and 28, respectively, are increased as the duty ratio becomes larger.

Figure 4:
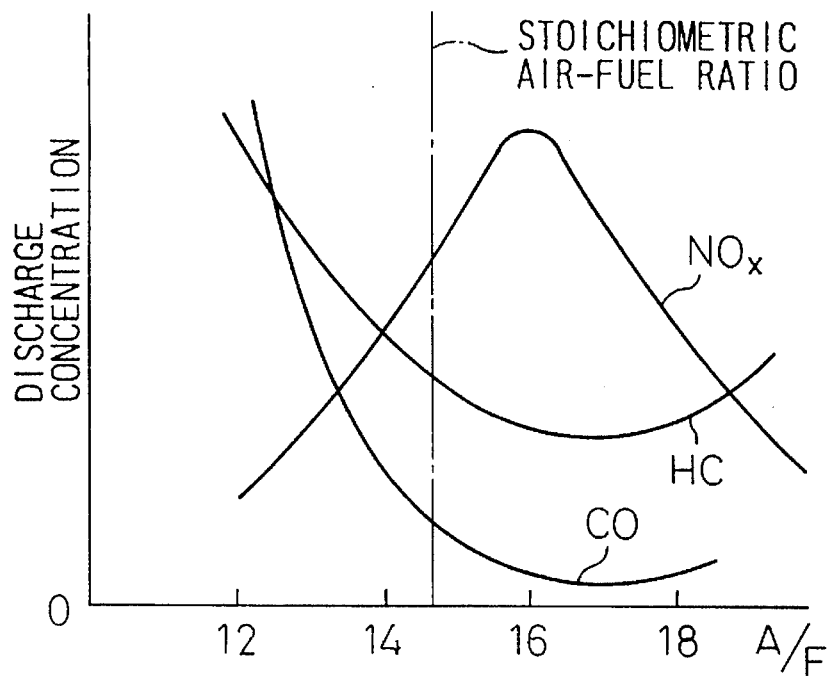
FIG. 4 is a diagram illustrating the concentration of NOx and unburned HC and CO discharged from the engine.

FIG. 4 illustrates the relationship between the air-fuel ratio A/F of the air-fuel mixture burned in the combustion chamber 3 and the concentration of NOx and unburned HC and CO produced in the combustion chamber 3, i.e., the concentration of NOx and unburned HC and CO discharged from the engine. As illustrated in FIG. 4, the amount of NOx discharged from the engine becomes maximum when the air-fuel ratio A/F of air-fuel mixture is slightly leaner than the stoichiometric air-fuel ratio, and the amount of NOx discharged from the engine is reduced as the air-fuel ratio is made leaner or richer with respect to that air-fuel ratio A/F. Conversely, the amount of unburned HC and CO discharged from the engine is increased as the air-fuel ratio A/F of air-fuel mixture becomes richer.

Figure 5:
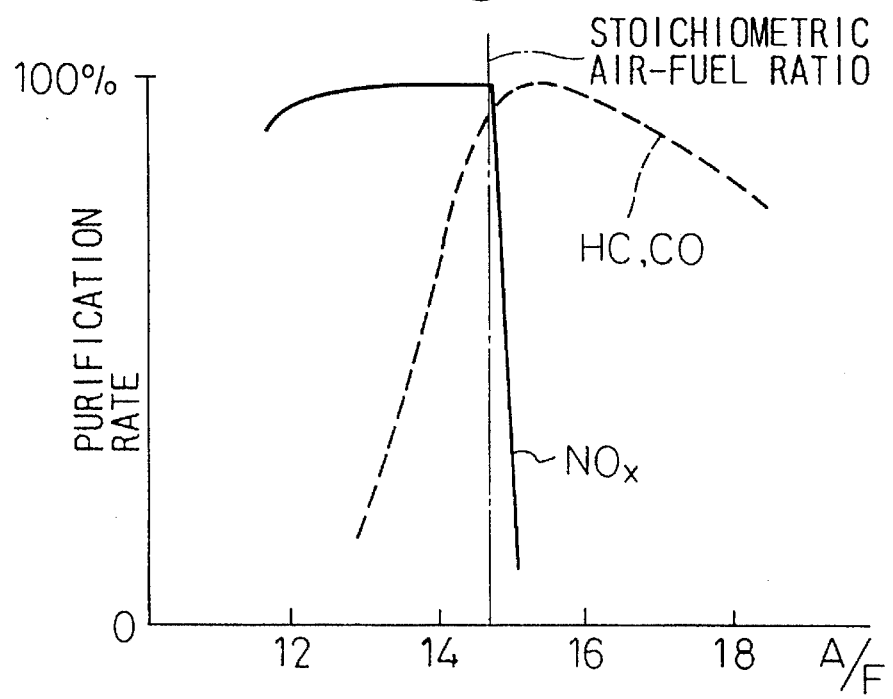
FIG. 5 is a diagram illustrating the purification rate in the three way catalyst.

FIG. 5 illustrates the relationship between the air-fuel ratio A/F of the exhaust gas flowing into the three way catalyst 17 and the purification rate of NOx and unburned HC and CO by the three way catalyst 17. When the air-fuel ratio A/F of the exhaust gas flowing into the three way catalyst 17 is lean, the reducing operation of NOx by the three way catalyst 17 is not carried out and thus, as illustrated by the solid line in FIG. 5, when the air-fuel ratio A/F of the exhaust gas flowing into the three way catalyst 17 becomes lean, the purification rate of NOx abruptly drops. Conversely, when the air-fuel ratio A/F of the exhaust gas flowing into the three way catalyst 17 is rich, the purification rate of NOx becomes almost 100 percent unless the air-fuel ratio of exhaust gas A/F becomes excessively rich.

In addition, as illustrated by the broken line in FIG. 5, the purification rate of unburned HC and CO becomes maximum when the air-fuel ratio A/F of the exhaust gas flowing into the three way catalyst 17 is slightly leaner than the stoichiometric air-fuel ratio. Conversely, if the air-fuel ratio A/F of the exhaust gas flowing into the three way catalyst 17 is made still leaner, the purification rate of unburned HC and CO gradually drops as the air-fuel ratio of exhaust gas A/F becomes leaner and, if the air-fuel ratio A/F of the exhaust gas flowing into the three way catalyst 17 is made rich, the purification rate of unburned HC and CO abruptly drops as the air-fuel ratio of the exhaust gas A/F becomes rich.

Figure 6:
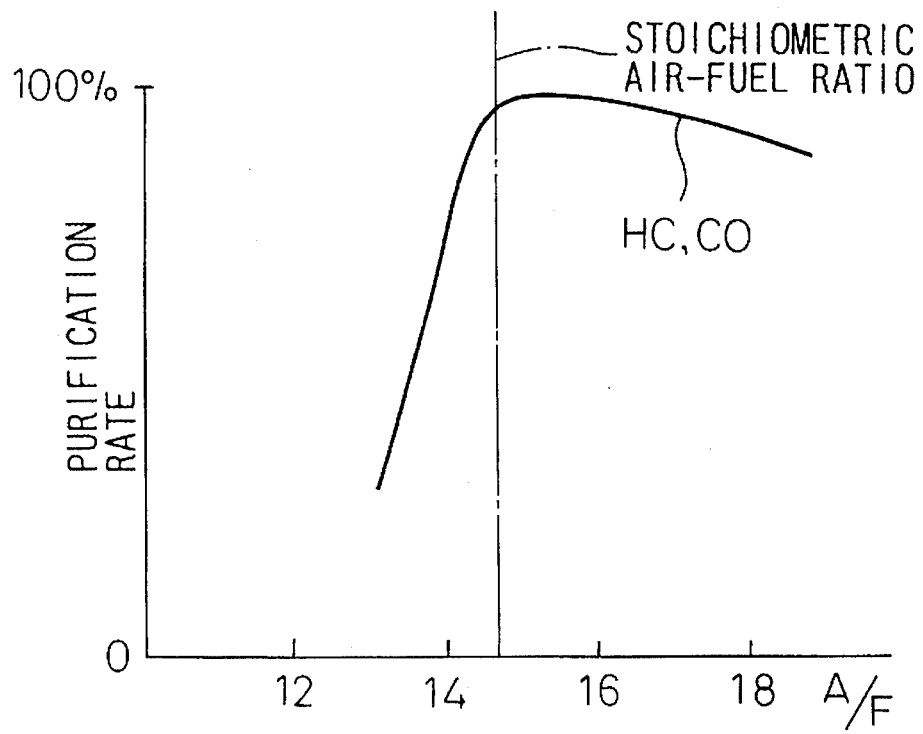
FIG. 6 is a diagram illustrating the purification rate in the oxidizing catalyst.

FIG. 6 illustrates the relationship between the air-fuel ratio A/F of the exhaust gas flowing into the oxidizing catalyst 20 and the purification rate of unburned HC and CO by the oxidizing catalyst 20. As illustrated in FIG. 6, the purification rate of unburned HC and CO becomes maximum when the air-fuel ratio A/F of the exhaust gas flowing into the oxidizing catalyst 20 is slightly leaner than the stoichiometric air-fuel ratio. Conversely, if the air-fuel ratio A/F of the exhaust gas flowing into the oxidizing catalyst 20 is made still leaner, the purification rate of unburned HC and CO gradually drops as the air-fuel ratio of exhaust gas A/F becomes leaner and, if the air-fuel ratio A/F of the exhaust gas flowing into the oxidizing catalyst 20 is made rich, the purification rate of unburned HC and CO abruptly drops as the air-fuel ratio of the exhaust gas A/F becomes leaner.

Next, the NOx absorbents 23, 24 arranged downstream of both the three way catalyst 17 and the oxidizing catalyst 20 will be described. These NOx absorbents 23, 24 use, for example, alumina as a carrier. On this carrier, at least one substance selected from alkali metals, for example, potassium K, sodium Na, lithium Li, and cesium Cs; alkali-earth metals, for example, barium Ba and calcium Ca; rare-earth metals, for example, lanthanum La and yttrium Y; and transition metals such as iron Fe and also a precious metal such as platinum Pt are carried. These NOx absorbents 23, 24 perform the absorption and releasing operation of NOx by absorbing the NOx when the air-fuel ratio of the exhaust gas flowing into the NOx absorbents 23, 24 is lean, while releasing the absorbed NOx when the concentration of oxygen in the exhaust gas flowing into the NOx absorbents 23, 24 falls.

Figure 7A:
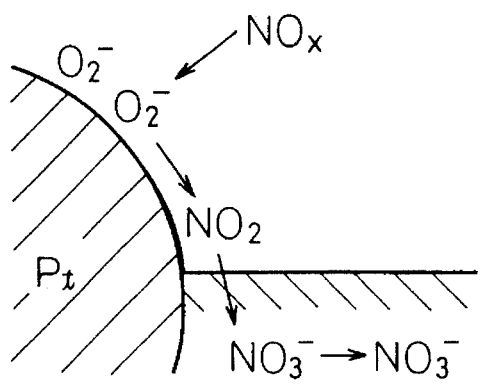
FIGS. 7A and 7B are diagrams illustrating the absorbing and releasing operation of NOx.
Figure 7B:
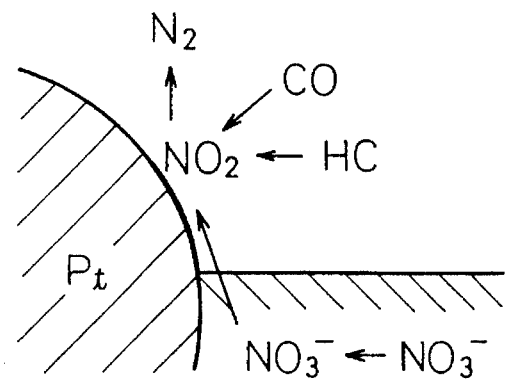

When these NOx absorbents 23, 24 are disposed in the exhaust passage of the engine, these NOx absorbents 23, 24 actually perform the absorption and releasing operation of NOx, but there are areas of the exact mechanism of this absorption and releasing operation which are not clear. However, it can be considered that this absorption and releasing operation is conducted by the mechanism as shown in FIGS. 7A and 7B. This mechanism will be explained by using as an example a case where platinum Pt and barium Ba are carried on the carrier, but a similar mechanism is obtained even if another precious metal, alkali metal, alkali earth metal, rare earth metal or transition metal is used.

Namely, if the air-fuel ratio of the exhaust gas flowing into the NOx absorbents 23, 24 becomes lean, i.e., the concentration of oxygen in the exhaust gas is greatly increased, as shown in FIG. 7A, the oxygen $O_2$ is deposited on the surface of the platinum Pt in the form of $O_2^-$ or $O^{2-}$. The NO in the exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 7A. In this way, NOx is absorbed into the NOx absorbents 23, 24.

Contrary to this, when the oxygen concentration in the exhaust gas flowing into the NOx absorbents 23, 24 is lowered and the production of $NO_2$ is lowered, the reaction proceeds in an inverse direction ($NO_3^- \rightarrow NO_2$), and thus nitric acid ions $NO_3^-$ in the absorbent are released in the form of $NO_2$ from the absorbent. Namely, when the oxygen concentration in the exhaust gas flowing into the NOx absorbents 23, 24 is lowered, for example when the air-fuel ratio of the exhaust gas flowing into the NOx absorbents 23, 24 is switched over from lean to rich, NOx is released from the NOx absorbents 23, 24. Accordingly, where it is desirable that NOx is not released from the NOx absorbents 23, 24, it is necessary to maintain the air-fuel ratio of the exhaust gas flowing into the NOx absorbents 23, 24 at a lean air-fuel ratio.

Figure 8:
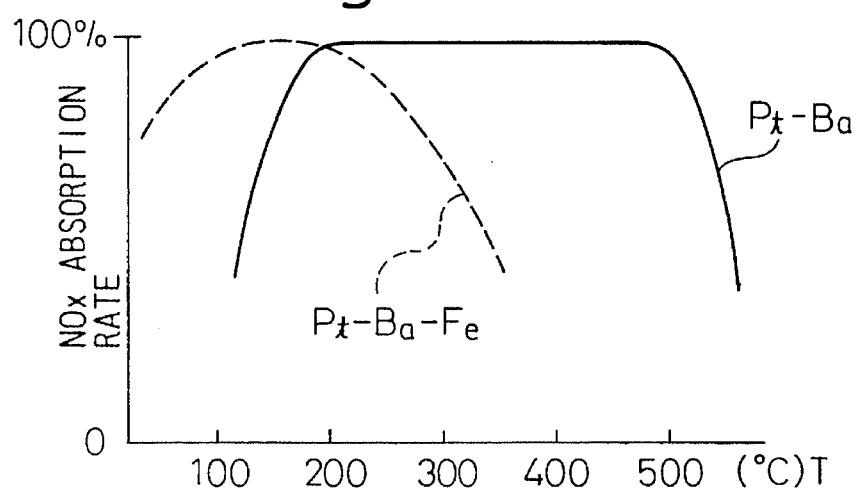
FIG. 8 is a diagram illustrating the absorption rate of NOx.

The absorption rate of NOx of the NOx absorbents 23, 24 has temperature characteristics which change in accordance with kinds of metals carried on the carrier. Namely, as illustrated in FIG. 8, in the Pt-Ba absorbent formed by the combination of platinum Pt and barium Ba, the absorption rate of NOx becomes maximum in a middle temperature ranging from 200° C. to 500° C. Conversely, in the Pt-Ba-Fe absorbent formed by the combination of platinum Pt, barium Ba and iron Fe, the absorption rate of NOx becomes maximum in a low temperature below 200° C. For example, in the Pt-Ba absorbent, if the temperature of the absorbent becomes low, the oxidizing reaction of NOx on the surface of platinum Pt does not proceed and, in addition, the absorption speed of NOx into the absorbent becomes low. As a result, the absorption rate of NOx drops. Conversely, if the temperature of the absorbent becomes high, the nitrite in the absorbent is broken down and NOx is released from the absorbent. As a result, the absorption rate of NOx drops. However, the relationships between the temperature and the oxidizing reaction of NOx, between the temperature and the absorbing operation of NOx, and between the temperature and the decomposition of nitrite change in accordance with the kinds of metals carried on the carrier. Accordingly, as illustrated in FIG. 8, the temperature regions in which the maximum absorption rate of NOx is obtained change in accordance with the kinds of metals carried on the carrier.

In this way, since the temperature regions in which the maximum absorption rate of NOx is obtained change in accordance with the kinds of metals carried on the carrier, it is preferable to use the NOx absorbents taking this matter into consideration. Thus, in the embodiment illustrated in FIG. 1, a NOx absorbent such as the Pt-Ba-Fe absorbent having the maximum absorption rate of NOx at a low temperature is used as the NOx absorbent 23, and a NOx absorbent such as a Pt-Ba absorbent having the maximum absorption rate of NOx at a middle temperature is used as the NOx absorbent 24. In this way, if the NOx adsorbents 23 and 24 having different temperature regions in which the absorption rate of NOx becomes maximum are arranged in series, NOx can be absorbed in the NOx adsorbents 23, 24 over a wide range of the operating state of the engine from the start of the engine at which the temperature of the exhaust gas is low to the high load operating state in which the temperature of the exhaust gas becomes high.

Figure 9:
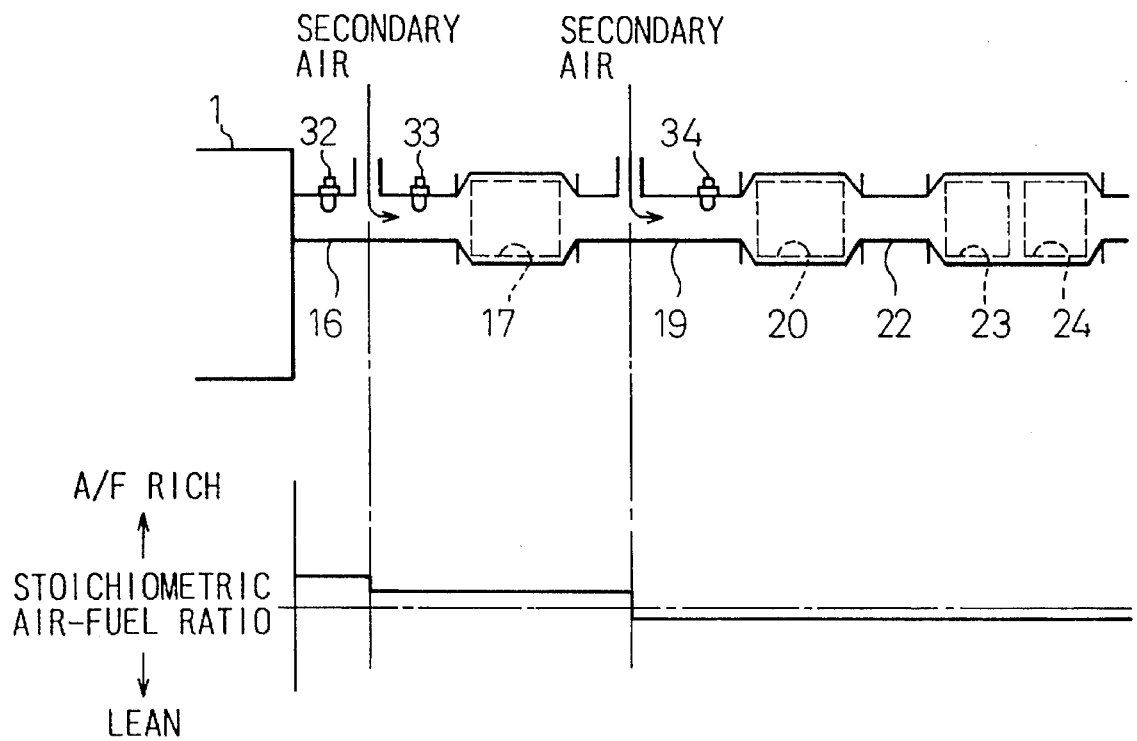
FIG. 9 is a diagram illustrating the air-fuel ratio at various points in the exhaust passage after the warm-up of the engine is completed.

FIG. 9 schematically illustrates the air-fuel ratio A/F of the air-fuel mixture burned in the combustion chamber 3 and the air-fuel ratio A/F of the exhaust gas in the exhaust passage.

Namely, what should be initially done to reduce the amount of NOx discharged into the outside air is to reduce the amount of NOx produced in the combustion chamber 3. To this end, as can be seen from FIG. 4, it is necessary to make the air-fuel ratio A/F of the air-fuel mixture burned in the combustion chamber 3 either extremely lean or rich. In this case, however, taking the purifying operation of NOx by the three way catalyst 17 into consideration, as can be seen from FIG. 5, the air-fuel ratio A/F of the exhaust gas flowing into the three way catalyst 17 must be made rich. Accordingly, in the present invention, the air-fuel ratio A/F of the air-fuel mixture burned in the combustion chamber 3 is made rich.

In this case, however, as can be seen from FIG. 4, the amount of NOx produced in the combustion chamber 3 is decreased as the air-fuel ratio of air-fuel mixture becomes rich. Accordingly, considered from just this viewpoint, it is desirable to make the air-fuel ratio of the air-fuel mixture as rich as possible. However, as can be seen from FIG. 5, the purification rate of unburned HC and CO by the three way catalyst 17 drops as the air-fuel ratio of the exhaust gas flowing into the three way catalyst 17 becomes rich. Accordingly, taking the reduction in the amount of NOx and the reduction in the amount of unburned HC and CO into consideration at the same time, it is preferable to bring the air-fuel ratio of the exhaust gas flowing into the three way catalyst as close to the stoichiometric air-fuel ratio as possible. As opposed to this, it is preferable to make the air-fuel ratio of the air-fuel mixture burned in the combustion chamber 3 richer than the air-fuel ratio of the exhaust gas flowing into the three way catalyst 17.

Figure 10A:
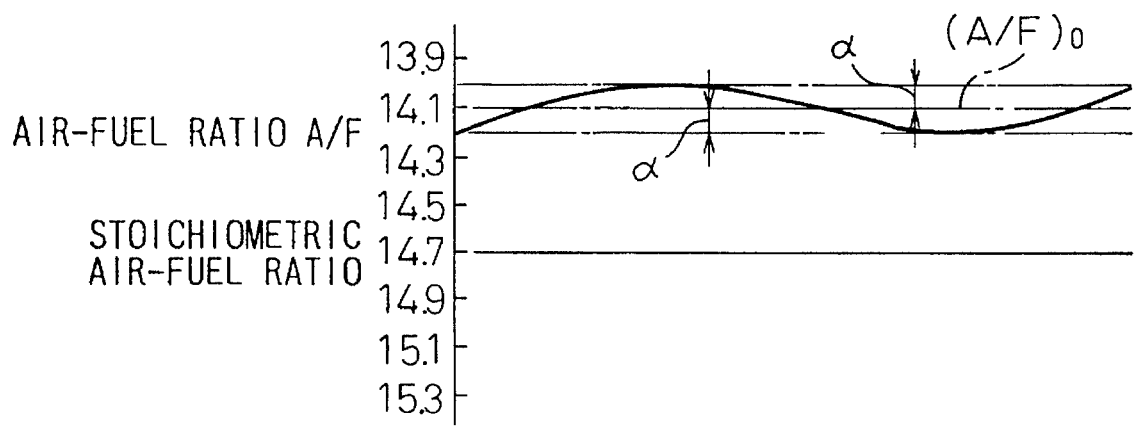
FIGS. 10A, 10B, and 10C are diagrams illustrating the control region of the air-fuel ratio.

Therefore, in the embodiment of the present invention, as shown in FIG. 9, secondary air is fed into the exhaust pipe 16 upstream of the three way catalyst 17, whereby the air-fuel ratio of the exhaust gas flowing into the three way catalyst 17 can be made larger than the air-fuel ratio of the air-fuel mixture burned in the combustion chamber 3. Note that while speaking of making the air-fuel ratio of the air-fuel mixture burned in the combustion chamber 3 rich, when considering the amount of consumption of fuel, it cannot be made too rich. Accordingly, in normal driving, the air-fuel ratio of the air-fuel mixture burned in the combustion chamber 3 is made just slightly richer than the air-fuel ratio of the exhaust gas flowing into the three way catalyst 17. More specifically, in the embodiment of the present invention, the target air-fuel ratio $(A/F)_0$ of the air-fuel mixture burned in the combustion chamber 3 is set to for example 14.1 as shown in FIG. 10A and the amount of fuel injection is controlled by a feedback operation based on the output signals of the first air-fuel ratio sensor 32 so that the air-fuel ratio A/F of the air-fuel mixture is maintained between $(A/F)_0+\alpha$ (for example, 14.2) and $(A/F)_0-\alpha$ (for example, 14.0). However, when it is necessary to make the air-fuel mixture supplied in the combustion chamber 3 excessively rich as during engine startup and high load engine operation, the target air-fuel ratio $(A/F)_0$ of the air-fuel mixture supplied in the combustion chamber 3 can be made smaller in accordance with need.

However, as explained above, it is desirable to bring the air-fuel ratio of exhaust gas flowing into the three way catalyst 17 as close as possible to the stoichiometric air-fuel ratio. If the air-fuel ratio of the exhaust gas is brought too close to to stoichiometric air-fuel ratio, however, the air-fuel ratio of the exhaust gas will become lean due to slight changes in the amount of fuel or air. Nevertheless, as can be seen from FIG. 5, if the air-fuel ratio of exhaust gas becomes lean, the amount of NOx flowing out from the three way catalyst 17 without being purified is extremely increased. Accordingly, it is impossible to bring the air-fuel ratio of the exhaust gas too close to the stoichiometric air-fuel ratio.

Figure 10B:
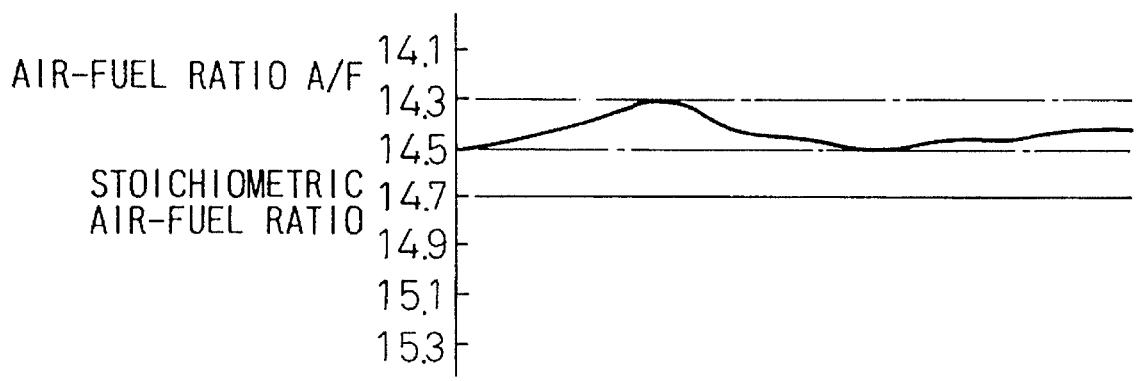

Thus, in the embodiment according to the present invention, the air-fuel ratio of the exhaust gas is maintained at a rich air-fuel ratio which is as close to the stoichiometric air-fuel ratio as possible within a range in which the air-fuel ratio of the exhaust gas does not become lean due to slight changes in the amount of fuel and air, thus enabling a high purification rate of NOx and as high as possible a purification rate of unburned HC and CO to be maintained. Specifically speaking, in the embodiment according to the present invention, the amount of secondary air fed into the exhaust manifold 16 is controlled by feedback operation on the basis of the output signal of the second air-fuel ratio sensor 33 so that the air-fuel ratio of the exhaust gas is maintained between about 14.3 and about 14.5, as illustrated in FIG. 10B. Note that, when this feedback control is carried out, the purification rate of NOx becomes almost 99.9 percent, and the purification rate of unburned HC and CO becomes more than 70 percent. Accordingly, a small amount of unburned HC and CO is contained in the exhaust gas passing through the three way catalyst 17, but the amount of NOx contained in this exhaust gas becomes extremely small.

The exhaust gas passing through the three way catalyst 17 flows into the oxidizing catalyst 20 and then flows into the NOx adsorbents 23, 24. In this case, as illustrated in FIG. 6, the purification rate of unburned HC and CO by the oxidizing catalyst 20 becomes the maximum when the air-fuel ratio A/F of the exhaust gas flowing into the oxidizing catalyst 20 is slightly leaner than the stoichiometric air-fuel ratio and, if the air-fuel ratio A/F of the exhaust gas flowing into the oxidizing catalyst 20 becomes rich, the purification rate of unburned HC and CO abruptly drops. In addition, to have NOx absorbed in the NOx absorbents 23, 24, the air-fuel ratio A/F of the exhaust gas flowing into the NOx adsorbents 23, 24 must be made lean and, if the air-fuel ratio A/F of the exhaust gas flowing into the NOx absorbents 23, 24 is made rich, NOx is released from the NOx absorbents 23, 24. Accordingly, to sufficiently purify unburned HC and CO in the exhaust gas passing through the three way catalyst 17 by the oxidizing catalyst 20 and cause NOx in the exhaust gas passing through the three way catalyst 17 to be absorbed in the NOx absorbents 23, 24, the air-fuel ratio A/F of the exhaust gas flowing into both the oxidizing catalyst 20 and the NOx absorbents 23, 24 must be maintained at a lean air-fuel ratio. To this end, as illustrated in FIG. 9, secondary air is fed into the exhaust pipe 19 upstream of the oxidizing catalyst 20 and the NOx absorbents 23, 24.

Figure 10C:
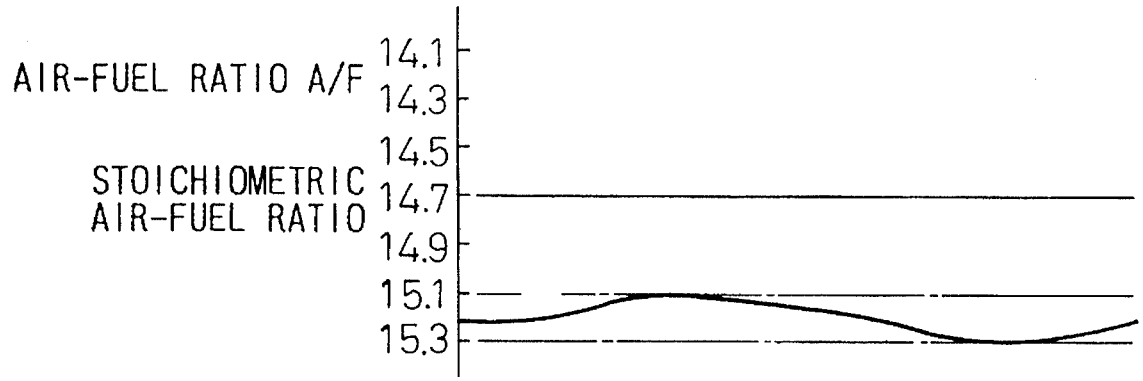

As mentioned above, to make the purification rate of unburned HC and CO by the oxidizing catalyst 20 the maximum, the air-fuel ratio of exhaust gas A/F must be maintained at an air-fuel ratio which is slightly leaner than the stoichiometric air-fuel ratio. Namely, at this time, even if the amount of fuel, air fed into the engine cylinders, or secondary air slightly changes, the air-fuel ratio of exhaust gas A/F must not become rich. Accordingly, in the embodiment according to the present invention, the amount of secondary air fed into the exhaust pipe 19 is controlled by feedback operation on the basis of the output signal of the third air-fuel ratio sensor 34 so that the air-fuel ratio of exhaust gas A/F is maintained between about 15.1 and about 15.3, as illustrated in FIG. 10C. Note that, when this feedback control is carried out, the purification rate of unburned HC and CO becomes almost 100 percent and, since the amount of NOx in the exhaust gas passing through the three way catalyst 17 is extremely small, almost all the NOx in the exhaust gas passing through the three way catalyst 17 is absorbed in the NOx absorbents 23, 24. Accordingly, in the embodiment according to the present invention, the amount of NOx and unburned HC and CO discharged into the outside air becomes almost zero.

As mentioned above, the amount of NOx in the exhaust gas passing through the three way catalyst 17 is extremely small. Accordingly, if the NOx absorbents 23, 24 are constructed so that they have a large volume, it is thought that the absorbing ability of NOx of the NOx absorbents 23, 24 will not be saturated within a time period in which a motor vehicle can be used. Accordingly, in the embodiment illustrated in FIG. 9, basically, it is not necessary to exchange the NOx absorbents 23, 24 with new ones. However, where it is difficult to sufficiently increase the volume of the NOx absorbents 23, 24, it is necessary to periodically exchange the NOx absorbents 23, 24 with new ones.

The air-fuel ratio sensors 32, 33, and 34 do not produce a regular output signal unless the temperature thereof exceeds a certain fixed temperature. Accordingly, the amount of secondary air fed into the exhaust manifold 16 and the exhaust pipe 19 is determined based on the target air-fuel ratio of the air-fuel mixture until before the air-fuel ratio sensors 32, 33, and 34 produce a regular output signal, and the amount of secondary air fed into the exhaust manifold 16 and the exhaust pipe 19 is controlled by feedback operation on the basis of the output signals of the air-fuel ratio sensors 32, 33, and 34 after the air-fuel ratio sensors 33, 33, and 34 produce a regular output signal.

As can be seen from FIG. 8, even if the temperature of the NOx absorbent 23 is low, the NOx absorbing operation by the NOx absorbent 23 is started, and accordingly, if the engine is started, the NOx absorbing operation of the NOx absorbent 23 is immediately started. However, the purifying operation of NOx and unburned HC and CO by the three way catalyst 17 is not started unless the temperature of the three way catalyst 17 becomes relatively high and, similarly, the purifying operation of unburned HC and CO by the oxidizing catalyst 20 is not started unless the temperature of the oxidizing catalyst 20 becomes relatively high. Accordingly, to immediately start the purifying operation of NOx and unburned HC and CO by the three way catalyst 17 and the purifying operation of unburned HC and CO by the oxidizing catalyst 20 after the engine is started, it is necessary to increase the temperature of the three way catalyst 17 and the oxidizing catalyst 20 to some extent before the start of the engine. To this end, in the embodiment according to the present invention, the three way catalyst 17 and the oxidizing catalyst 20 are electrically heated before the start of the engine.

For example, as illustrated in FIG. 11, when the engine is started, initially, the preheat switch 39 is turned ON by a driver and thereby, the supply of power to the heaters, i.e., the supply of power to the three way catalyst 17 and the oxidizing catalyst 20 is started. Then, shortly after that, the starter switch 38 is turned ON by the driver, and thereby the engine is started. If the engine is started, the supply of secondary air is immediately started. If this method is used, it is possible to start the purifying action of NOx and unburned HC and CO by the three way catalyst 17 as well as the purifying action of unburned HC and CO by the oxidizing catalyst 20 from the time of the start of the engine.

In this case, however, the driver is obliged to turn the starter switch 38 ON after some time has elapsed after the preheat switch 39 is turned ON. To ensure this is done, for example, one may design the system so that, when a fixed time has not elapsed after the preheat switch 39 is turned ON, even if the starter switch 38 is turned ON, the starter motor will not be driven. In addition, one may adopt another system such that, the temperatures of the three way catalyst 17 and the oxidizing catalyst 20 are detected, and the starter motor can be driven after the temperature of the three way catalyst 17 and the oxidizing catalyst 20 sufficiently rise.

In addition, in the embodiment according to the present invention, as illustrated in FIG. 11, the ignition time is retarded for a short time after the engine is started. If the ignition time is retarded, since the combustion is prolonged to the end of the power stroke, the temperature of the exhaust gas increases. If the temperature of the exhaust gas increases, the three way catalyst 17 and the oxidizing catalyst 20 are maintained at a high temperature due to the heating of the exhaust gas, and thus, it is possible to obtain a good purifying action of NOx and unburned HC and CO by the three way catalyst 17 and a good purifying action of unburned HC and CO by the oxidizing catalyst 20.

Next, the control routine for the engine will be described with reference to the flow charts of FIGS. 12 through 15.

Figure 12:
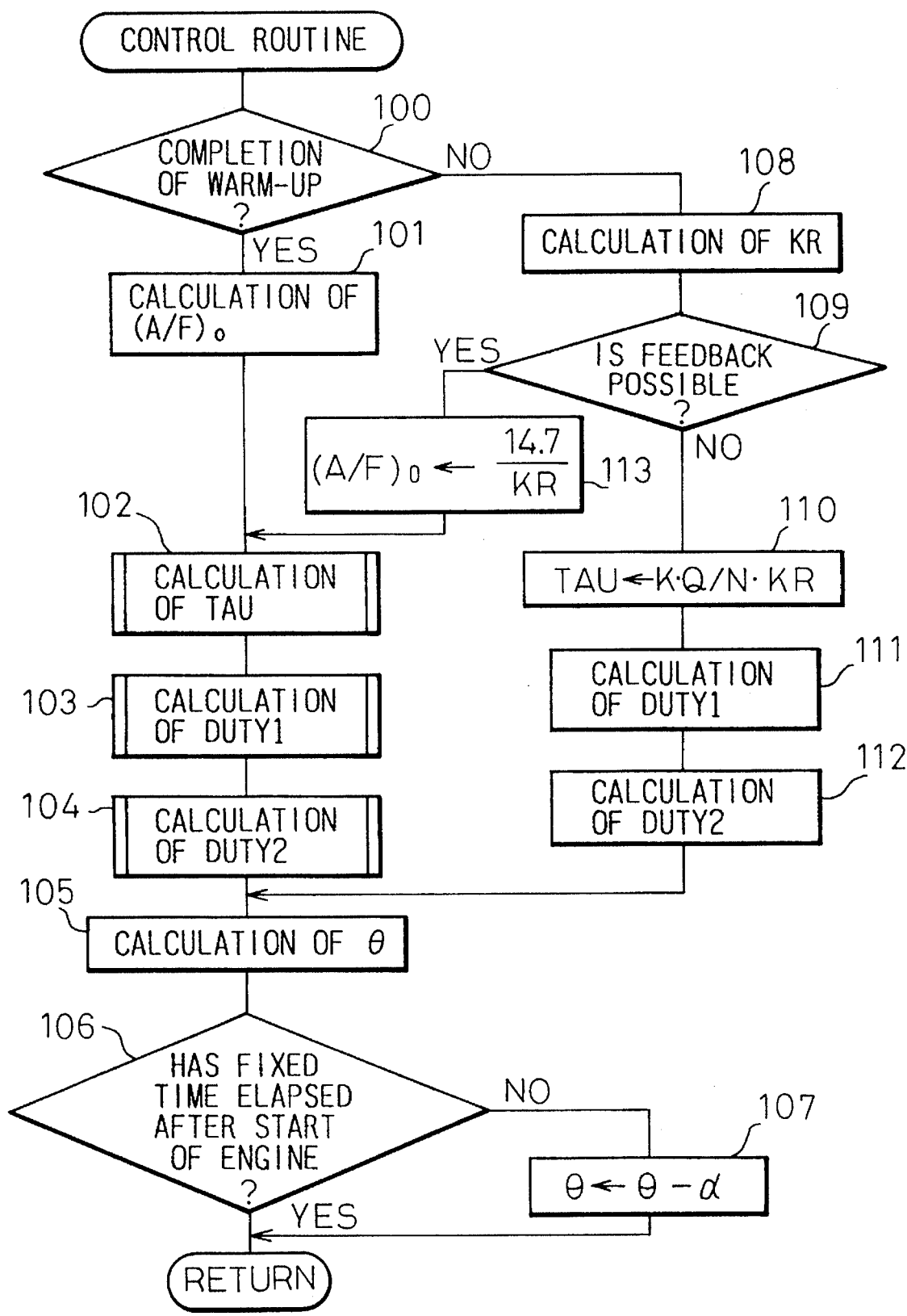
FIG. 12 is a flow chart of the control routine of the engine.
Figure 16A:
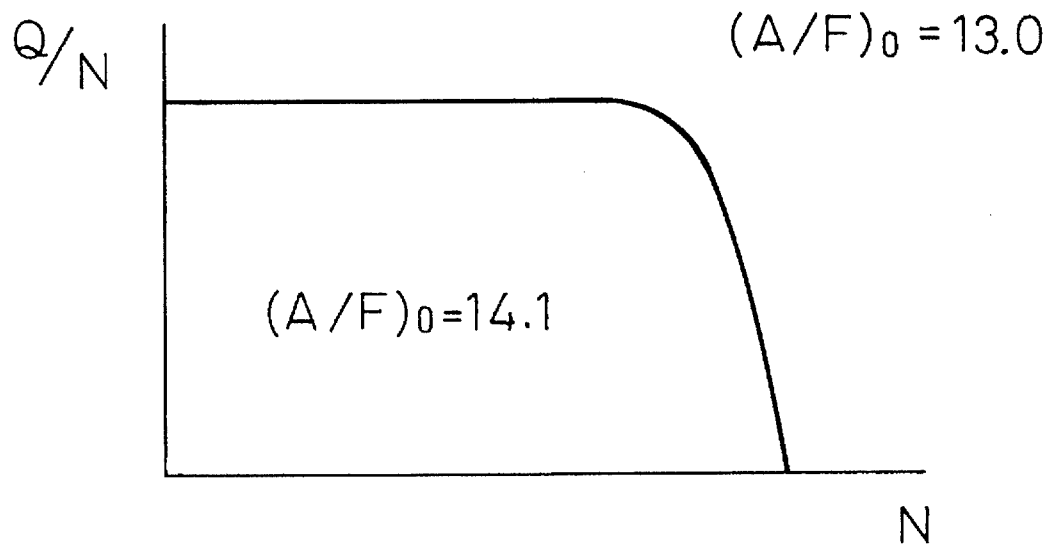
FIGS. 16A and 16B are diagrams illustrating the target air-fuel ratio $(A/F)_0$ etc.

Referring to FIG. 12, first, at step 100, it is determined based on, for example, the temperature of the engine coolant whether or not the warm-up of the engine is completed. If the warm-up of the engine has been completed, the routine goes to step 101, at which the target air-fuel ratio $(A/F)_0$ is calculated. This target air-fuel ratio $(A/F)_0$, as shown in FIG. 16A, is a function of the engine load Q/N (mass flow Q of intake air/engine speed N) and the engine speed N. As will be understood from FIG. 16A, the target air-fuel ratio $(A/F)_0$ is set to 13.0 at the time of a high engine load operation or a high speed engine operationn and is set to 14.1 at other times. Next, at step 102, the fuel injection time TAU is calculated. The calculation routine of this fuel injection time TAU is shown in FIG. 13.

Figure 13:
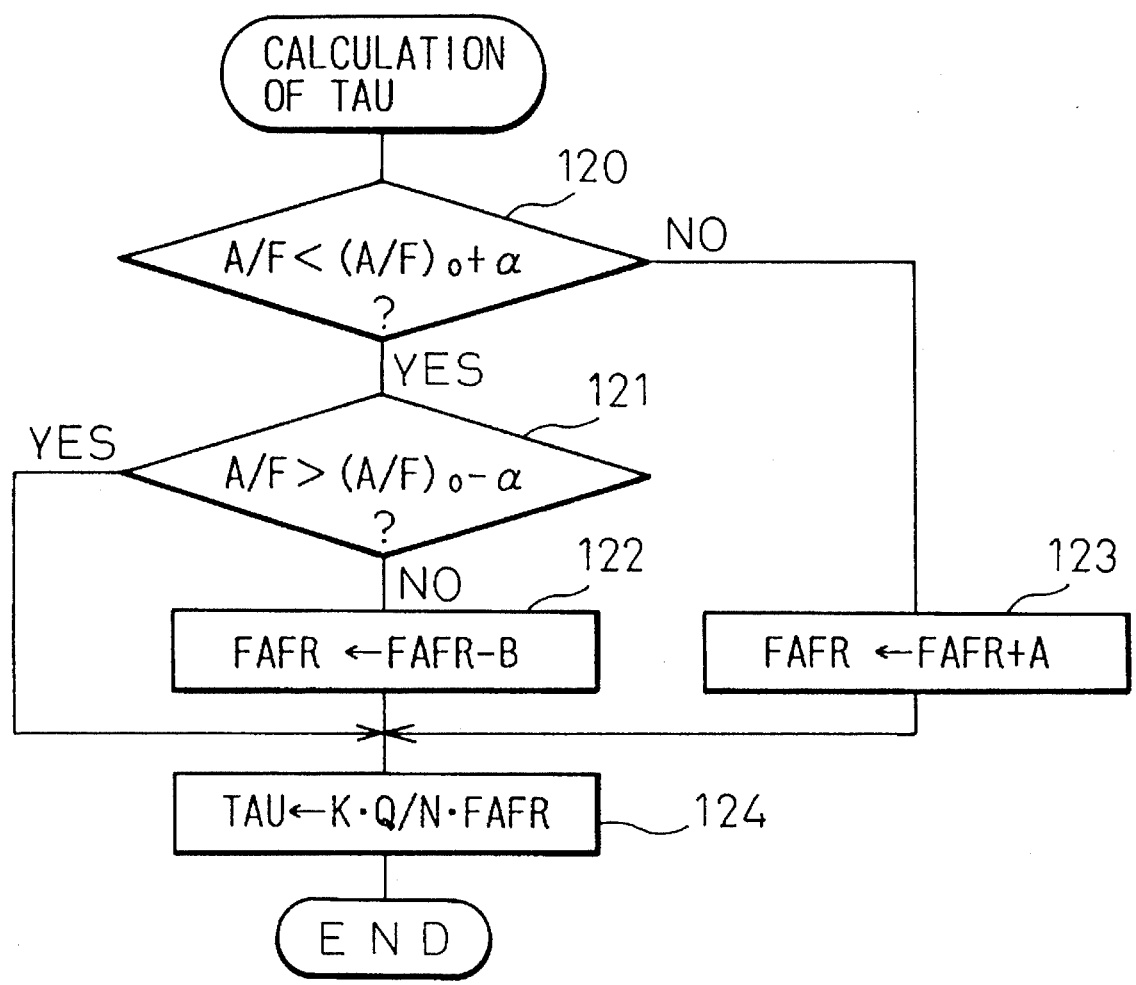
FIG. 13 is a flow chart for calculating the fuel injection time TAU.

Referring to FIG. 13, at step 120, it is determined whether or not the air-fuel ratio of exhaust gas A/F detected by the first air-fuel ratio sensor 32 is smaller than $(A/F)_0+\alpha$. When $A/F \geq (A/F)_0+\alpha$, the routine goes to step 123, and a fixed value A is added to the correction coefficient FAFR. Then, the routine goes to step 124. Conversely, if $A/F<(A/F)_0+\alpha$, the routine goes to step 121, and it is determined whether or not the air-fuel ratio of exhaust gas A/F detected by the first air-fuel ratio sensor 32 is larger than $(A/F)_0-\alpha$. If $A/F \leq (A/F)_0-\alpha$, the routine goes to step 122, and a fixed value B is subtracted from the correction coefficient FAFR. Then, the routine goes to step 124. Conversely, if $A/F>(A/F)_0-\alpha$, the routine goes to step 124.

At step 124, the fuel injection time TAU is calculated based on the following formula.

$$TAU = K \cdot Q/N \cdot FAFR$$

Where, Q represents the mass flow amount of air detected by the mass flow detector 15, and N represents an engine speed. Accordingly, Q/N represents the mass flow amount of air fed into the engine cylinder per one cycle. In addition, K is a constant value and is determined so that, when the amount of injected fuel is made $K \cdot Q/N$, the air-fuel ratio of the air-fuel mixture fed into the engine cylinders becomes equal to the stoichiometric air-fuel ratio. In other words, $K \cdot Q/N$ represents a basic fuel injection time which is necessary to make the air-fuel ratio of air-fuel mixture the stoichiometric air-fuel ratio, and accordingly, the fuel injection time TAU is found by multiplying the basic fuel injection time $K \cdot Q/N$ by the correction coefficient FAFR.

As can be seen from FIG. 13, if $A/F \geq (A/F)_0+\alpha$, the correction coefficient FAFR is increased and, if $A/F \leq (A/F)_0-\alpha$, the correction coefficient FAFR is decreased. In addition, if $(A/F)_0-\alpha<A/F<(A/F)_0+\alpha$, the correction coefficient FAFR is maintained as it is. Accordingly, the air-fuel ratio A/F of the air-fuel mixture fed into the combustion chamber 3 is maintained between $(A/F)_0-\alpha$ and $(A/F)_0+\alpha$.

Returning to FIG. 12, if the calculation of the fuel injection time TAU is completed at step 102, the routine goes to step 103, and the duty ratio DUTY1 for controlling the first secondary air supply valve 27 is calculated. The calculation routine of this duty ratio DUTY1 is shown in FIG. 14.

Figure 14:
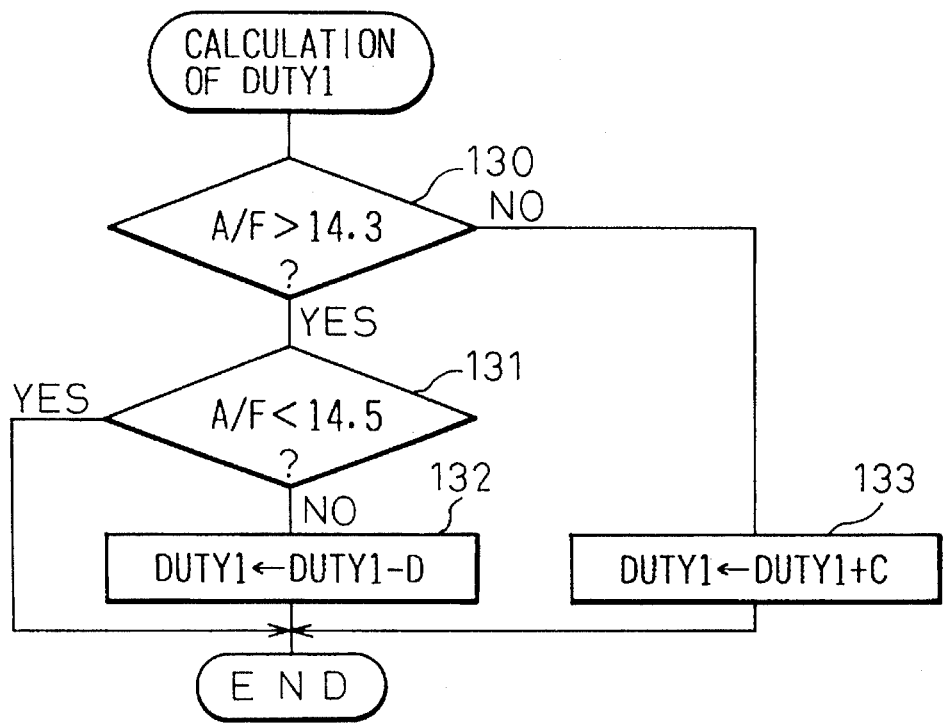
FIG. 14 is a flow chart for calculating the duty ratio DUTY1.

Referring to FIG. 14, at step 130, it is determined whether or not the air-fuel ratio of exhaust gas A/F detected by the second air-fuel ratio sensor 33 is larger than 14.3. If $A/F \leq 14.3$, the routine goes to step 133, and a fixed value C is added to the duty ratio DUTY1. Conversely, if $A/F>14.3$, the routine goes to step 131. At step 131, it is determined whether or not the air-fuel ratio of exhaust gas A/F detected by the second air-fuel ratio sensor 33 is smaller than 14.5. If $A/F \geq 14.5$, the routine goes to step 132, and a fixed value D is subtracted from the duty ratio DUTY1.

As can be seen from FIG. 14, when $A/F \geq 14.3$, the duty ratio DUTY1 is increased, and thereby the amount of secondary air fed into the exhaust manifold 16 from the first secondary air supply valve 27 is increased. Conversely, when $A/F \geq 14.5$, the duty ratio DUTY1 is decreased, and thereby the amount of secondary air fed into the exhaust manifold 16 from the first secondary air supply valve 27 is reduced. In addition, when $14.3<A/F<14.5$, the duty ratio DUTY1 is maintained as it is. Thus, the air-fuel ratio A/F of the exhaust gas flowing into the three way catalyst 17 is maintained between 14.3 and 14.5.

Next, at step 104, the duty ratio DUTY2 for controlling the second secondary air supply valve 28 is calculated. The calculation routine of this duty ratio DUTY2 is shown in FIG. 15.

Figure 15:
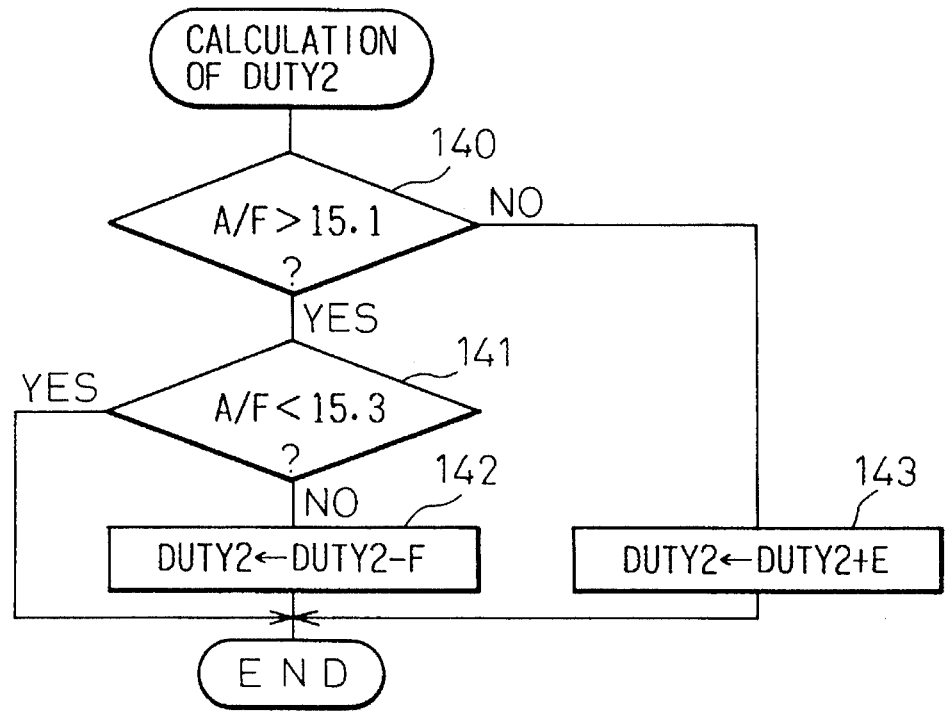
FIG. 15 is a flow chart for calculating the duty ratio DUTY2.

Referring to FIG. 15, at step 140, it is determined whether or not the air-fuel ratio of exhaust gas A/F detected by the third air-fuel ratio sensor 34 is larger than 15.1. If $A/F \leq 15.1$, the routine goes to step 143, and a fixed value E is added to the duty ratio DUTY2. Conversely, if $A/F>15.1$, the routine goes to step 141. At step 141, it is determined whether or not the air-fuel ratio of exhaust gas A/F detected by the third air-fuel ratio sensor 34 is smaller than 15.3. If $A/F \geq 15.3$, the routine goes to step 142, and a fixed value F is subtracted from the duty ratio DUTY2.

As can be seen from FIG. 15, when $A/F \geq 15.1$, the duty ratio DUTY2 is increased, and thereby the amount of the secondary air fed into the exhaust pipe 19 from the second secondary air supply valve 28 is increased. Conversely, when $A/F \geq 15.3$, the duty ratio DUTY2 is decreased, and thereby the amount of secondary air fed into the exhaust pipe 19 from the second secondary air supply valve 28 is reduced. In addition, when $15.1<A/F<15.3$, the duty ratio DUTY2 is maintained as it is. Thus, the air-fuel ratio A/F of the exhaust gas flowing into the oxidizing catalyst 20 and the NOx absorbents 23, 24 is maintained between 15.1 and 15.3.

Figure 16B:
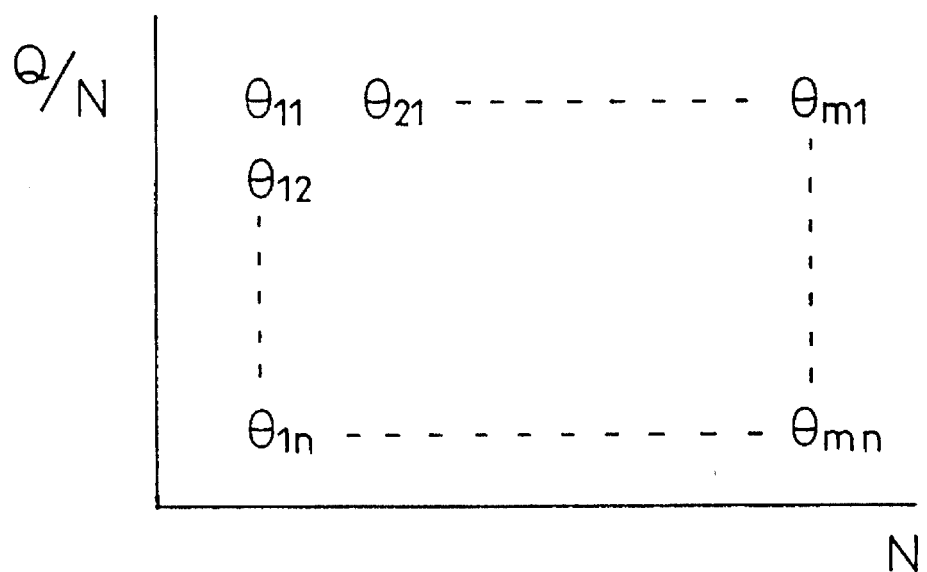

Returning to FIG. 12, if the duty ratio DUTY2 is calculated at step 104, the routine goes to step 105, and the ignition time θ is calculated. This ignition time θ is stored in advance in the ROM 42 in the form of a map as illustrated in FIG. 16B as a function of the engine speed N and the engine load Q/N (mass flow amount of air Q fed into the engine cylinders/the engine speed N). Then, at step 106, it is determined whether or not a fixed time has elapsed after the engine is started. If the fixed time has elapsed after the engine is started, the processing cycle is completed. Conversely, if the fixed time has not elapsed yet after the engine is started, the routine goes to step 107, and the ignition time θ is retarded by α.

Figure 17A:
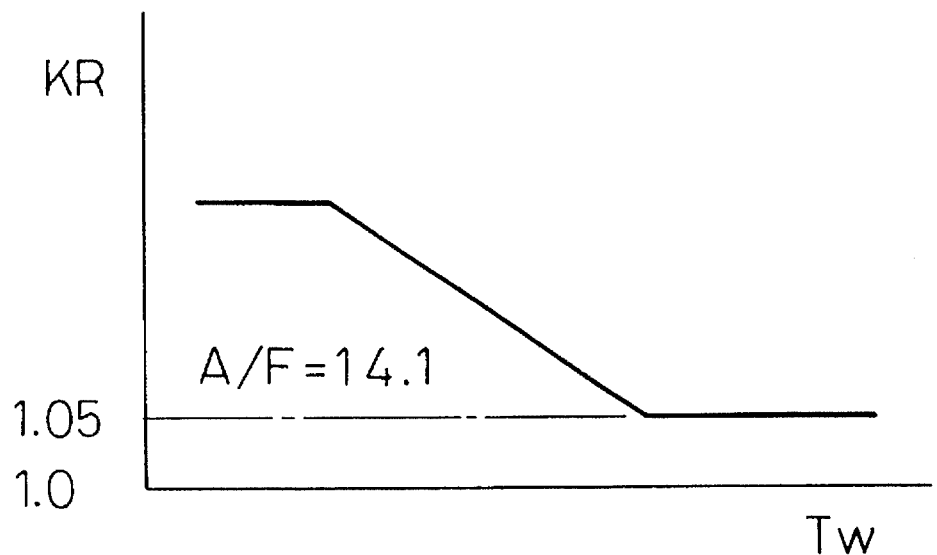
FIGS. 17A and 17B are diagrams illustrating the correction coefficient KR etc.

When it is determined at step 100 that the warm-up of the engine is not completed, the routine goes to step 108, and the correction coefficient KR for the basic fuel injection time $K \cdot Q/N$ is calculated. This correction coefficient KR is a function of, for example, the temperature Tw of the cooling water of the engine and is increased as the temperature Tw of the cooling water of the engine becomes low, as illustrated in FIG. 17A.

Then, at step 109, it is determined if feedback control by the air-fuel ratio sensors 32, 33, and 34 has become possible. If feedback control by the air-fuel ratio sensors 32, 33, and 34 has not become possible, the routine proceeds to step 110, where the fuel injection time TAU is calculated by multiplying the basic fuel injection time $K \cdot Q/N$ by the correction coefficient KR. At this time, the air-fuel ratio A/F of the air-fuel mixture fed into the combustion chamber 3 is made a rich air-fuel ratio corresponding to the value of the correction coefficient KR.

Figure 17B:
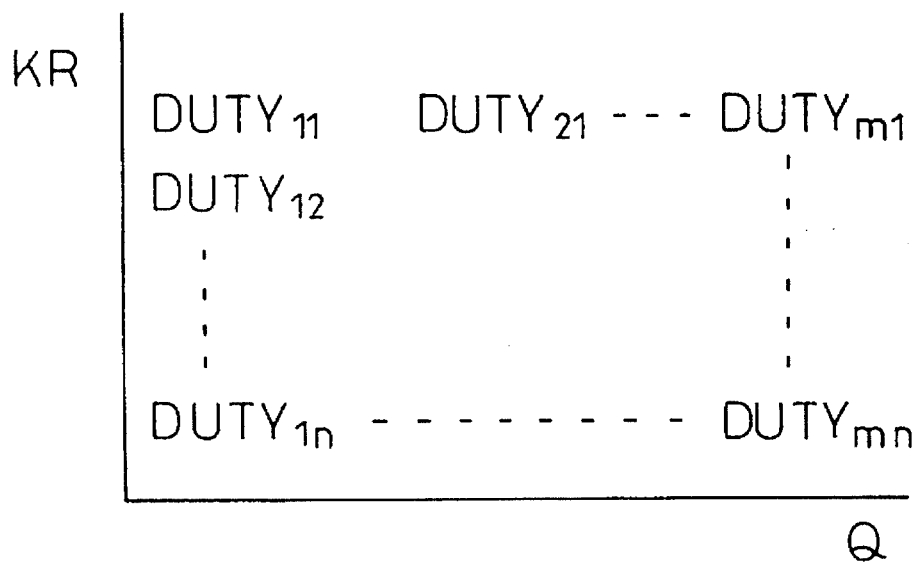

Then, at step 110, the duty ratio DUTY1 for controlling the first secondary air supply valve 27 is calculated. This duty ratio DUTY1 is a duty ratio which is necessary to bring the air-fuel ratio A/F of the exhaust gas flowing into the three way catalyst 17 to from about 14.3 to about 14.5. This duty ratio DUTY1 is stored in advance in the ROM 42 in the form of a map as illustrated in FIG. 17B as a function of, for example, the mass flow amount Q of air and the correction coefficient KR.

Then, at step 112, the duty ratio DUTY2 for controlling the second secondary air supply valve 28 is calculated. This duty ratio DUTY2 is a duty ratio which is necessary to bring the air-fuel ratio A/F of the exhaust gas flowing into the oxidizing catalyst 20 and the NOx absorbents 23, 24 to from about 15.1 to about 15.3. This duty ratio DUTY2 is stored in advance in the ROM 42 in the form of a map as illustrated in FIG. 17B as a function of, for example, the mass flow amount Q of air and the correction coefficient KR, or as a function of only the mass flow amount Q of air.

When it is determined at step 109 that the feedback control by the air-fuel ratio sensors 32, 33, and 34 is possible, the routine goes to step 113, and the target air-fuel ratio $(A/F)_0$ is calculated by dividing the 14.7 by KR. Next, the routine proceeds to step 102. Accordingly, even when before the completion of engine warmup, when feedback control becomes possible, feedback control of the fuel injection time and the amount of the secondary air is performed.

Figure 18:
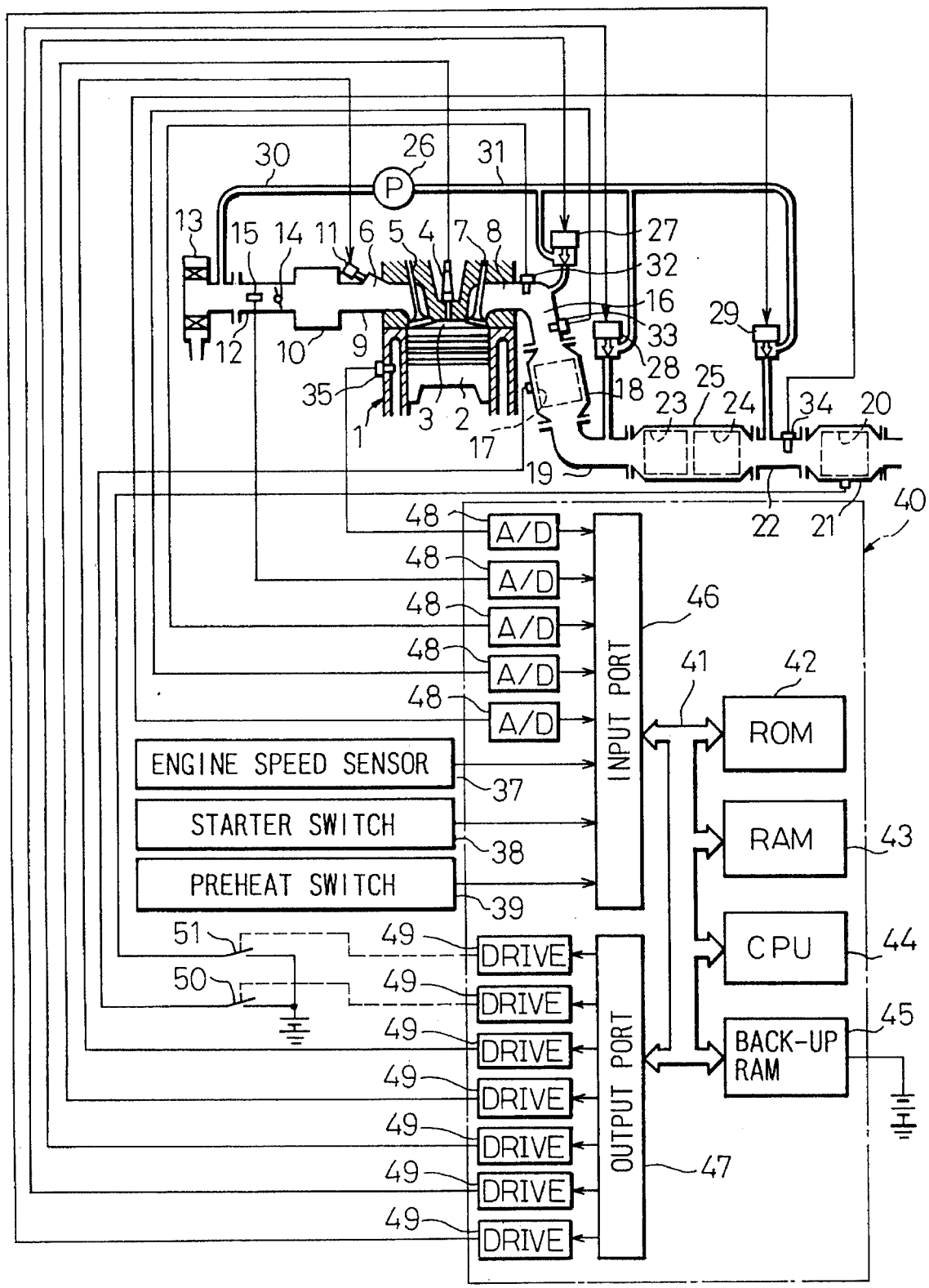
FIG. 18 is a general view of another embodiment of the engine.

FIG. 18 illustrates a second embodiment. In FIG. 18, similar components are indicated with the same reference numerals used in FIG. 1.

This second embodiment is different from the first embodiment illustrated in FIG. 1 in that, first, the order of the arrangement of the oxidizing catalyst 20 and the NOx absorbents 23, 24 is reversed compared to the first embodiment. Namely, in the second embodiment, the outlet of the catalytic converter 18 including the electrically heated three way catalyst 17 therein is connected, via the exhaust pipe 19, to the casing 25 including a pair of the NOx absorbents 23, 24 therein, and the outlet of the casing 25 is connected to the catalytic converter 21 including the electrically heated oxidizing catalyst 20 therein.

Second, in the second embodiment, a third secondary air supply valve 29 is additionally provided in addition to the first secondary air supply valve 27 and the second secondary air supply valve 28, and the discharge port of the air pump 26 is connected, via the conduit 31 and the third secondary air supply valve 29, to the exhaust pipe 22 arranged between the NOx absorbents 23, 24 and the oxidizing catalyst 20. The third secondary air supply valve 29 is connected to the output port 47 via the corresponding drive circuit 49, and the duty ratio of the third secondary air supply valve 29 is controlled based on the output signal of the electronic control unit 40.

Third, in this second embodiment, a third air-fuel ratio sensor 34 is arranged in the exhaust pipe 22 downstream of the third secondary air supply valve 29 and upstream of the oxidizing catalyst 20.

Figure 19:
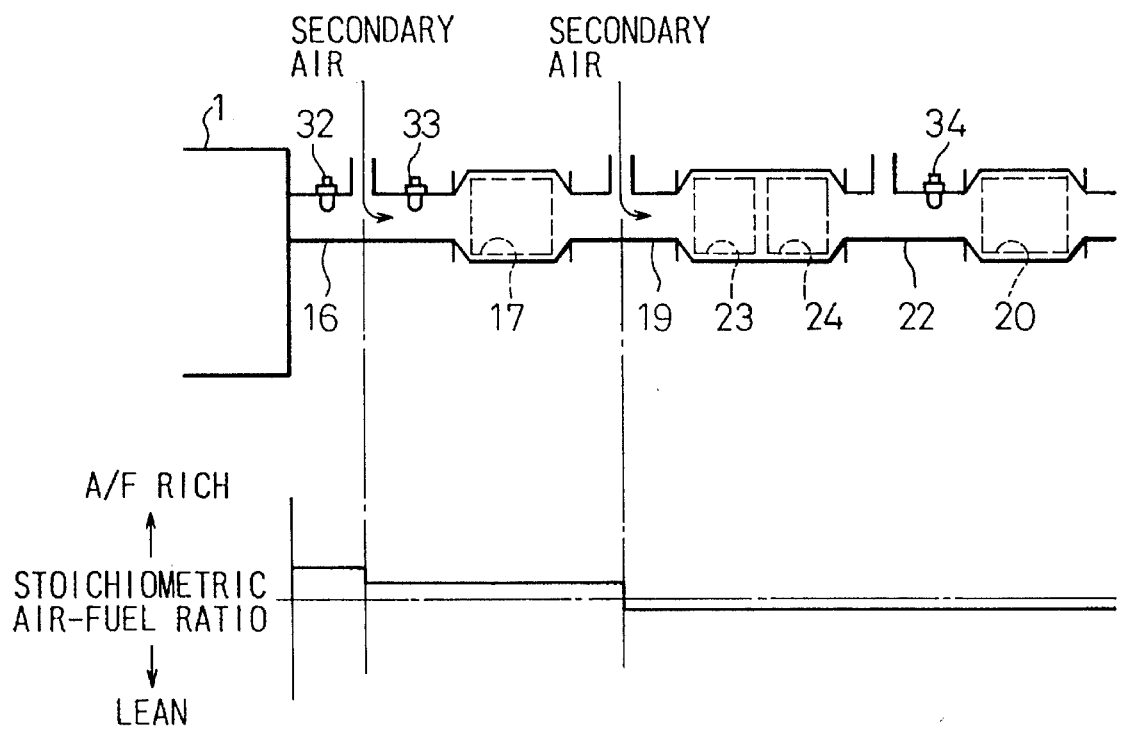
FIG. 19 is a diagram illustrating the air-fuel ratio at various points in the exhaust passage.

The most distinctive feature of the second embodiment resides in the fact that NOx is released from the NOx absorbents 23, 24 in accordance with necessity so that the absorbing operation of NOx can be carried out for a long time even if the NOx absorbents 23, 24 are not exchanged for new ones. The second embodiment is basically no different from the first embodiment in that the control is performed when NOx is not being released from the NOx absorbents 23, 24. Namely, referring to FIG. 19 which schematically illustrates the air-fuel ratio A/F of the air-fuel mixture burned in the combustion chamber 3 and the air-fuel ratio A/F of the exhaust gas in the exhaust passage, also in this second embodiment, the air-fuel ratio A/F of the air-fuel mixture fed into the combustion chamber 3 is controlled by the feedback operation on the basis of the output signals of the first air-fuel ratio sensor 32 so as to be maintained between $(A/F)_0-\alpha$ and $(A/F)_0+\alpha$ as illustrated in FIG. 10A, the amount of secondary air fed into the exhaust manifold 16 is controlled by the feedback operation on the basis of the output signals of the second air-fuel ratio sensor 33 so that the air-fuel ratio A/F of the exhaust gas flowing into the three way catalyst 17 is maintained between 14.3 and 14.5, as illustrated in FIG. 10B, and the amount of secondary air fed into the exhaust pipe 19 is controlled by the feedback operation on the basis of the output signals of the third air-fuel ratio sensor 34 so that the air-fuel ratio A/F of the exhaust gas flowing into the NOx absorbents 23, 24 and the oxidizing catalyst 20 is maintained between 15.1 and 15.3, as illustrated in FIG. 10C.

Accordingly, also in this second embodiment, the purification rate of NOx by the three way catalyst 17 becomes almost 99.9 percent, and the purification rate of unburned HC and CO by the three way catalyst 17 becomes more than 70 percent. Thus, a small amount of unburned HC and CO is contained in the exhaust gas passing through the three way catalyst 17, but the amount of NOx contained in this exhaust gas becomes extremely small. In addition, since the amount of NOx contained in the exhaust gas passing through the three way catalyst 17 is extremely small as mentioned above, almost all NOx contained in this exhaust gas is absorbed in the NOx absorbents 23, 24. Furthermore, almost 100 percent of unburned HC and CO is purified in the oxidizing catalyst 20. Accordingly, also in the second embodiment, the amount of NOx and unburned HC and CO discharged into the outside air becomes almost zero.

Figure 20:
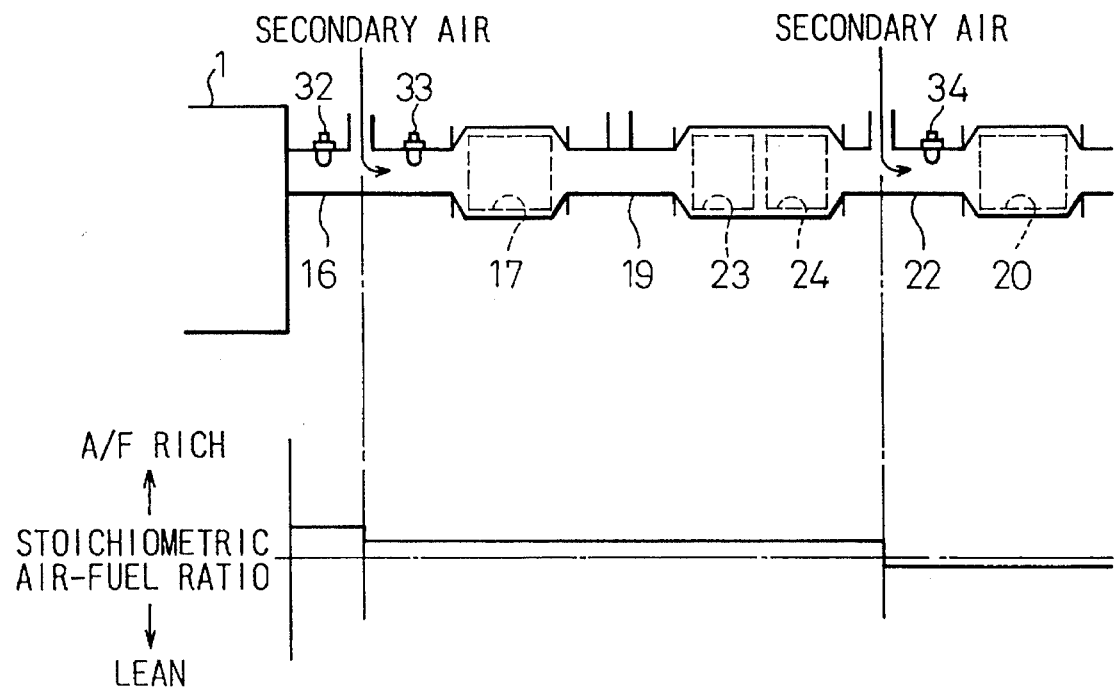
FIG. 20 is a diagram illustrating the air-fuel ratio at various points in the exhaust passage at the time when NOx is released from the NOx absorbent.

FIG. 20 schematically illustrates the air-fuel ratio A/F of the air-fuel mixture burned in the combustion chamber 3 and the air-fuel ratio A/F of the exhaust gas in the exhaust passage in the case where NOx is released from the NOx absorbents 23, 24.

As can be seen from FIG. 20, when NOx is to be released from the NOx absorbents 23, 24, the supply of secondary air into the exhaust pipe 19 upstream of the NOx absorbents 23, 24 is stopped. Accordingly, at this time, the air-fuel ratio A/F of the exhaust gas flowing into the NOx absorbents 23, 24 becomes rich, and thus NOx is released from the NOx absorbents 23, 24.

Namely, at this time, a large amount of unburned HC and CO is contained in the exhaust gas passing through the three way catalyst 17, and this unburnt HC and CO react with the oxygen $O_2^-$ on $O^{2-}$ on the platinum Pt and are oxidized. Also, when the air-fuel ratio A/F of the exhaust gas flowing into the NOx absorbents 23, 24 becomes rich, the oxygen concentration in the exhaust gas is lowered considerably, and therefore the $NO_2$ is released from the absorbent. This $NO_2$ reacts with the unburnt HC and CO as shown in FIG. 7B and is reduced. In this way, when the $NO_2$ no longer exists on the surface of the platinum Pt, the $NO_2$ is successively released from the absorbent. Accordingly, when the air-fuel ratio of the exhaust gas is made rich, the NOx is released from the NOx absorbents 23, 24 in a short time.

Namely, when the air-fuel ratio of the exhaust gas flowing into the NOx absorbents 23, 24 is made rich, first of all, the unburnt HC and CO immediately react with the $O_2^-$ or $O^{2-}$ on the platinum Pt and are oxidized, and subsequently if the unburnt HC and CO still remain even though the $O_2^-$ or $O^{2-}$ on the platinum Pt is consumed, the NOx released from the absorbent and the NOx discharged from the engine are reduced by these unburnt HC and CO. Accordingly, if the air-fuel ratio A/F of the exhaust gas flowing into the NOx absorbents 23, 24 is made rich, NOx absorbed in the NOx absorbents 23, 24 is released in a short time. In addition, since NOx thus released is reduced, there is no danger that NOx is discharged into the outside air.

When the releasing operation of NOx from the NOx absorbents 23, 24 is carried out, secondary air is fed into the exhaust pipe 22. At this time, the amount of secondary air fed into the exhaust pipe 22 is controlled by the feedback operation on the basis of the output signal of the third air-fuel ratio sensor 34 so that the air-fuel ratio A/F of the exhaust gas flowing into the oxidizing catalyst 20 is maintained between 15.1 and 15.3. Accordingly, at this time, almost 100 percent of unburned HC and CO is purified in the oxidizing catalyst 20. Accordingly, even when NOx is released from the NOx absorbents 23, 24, there is no danger that NOx and unburned HC and CO are discharged into the outside air.

Next, the control routine for the engine will be described with reference to FIGS. 21A through 25.

Figure 21A:
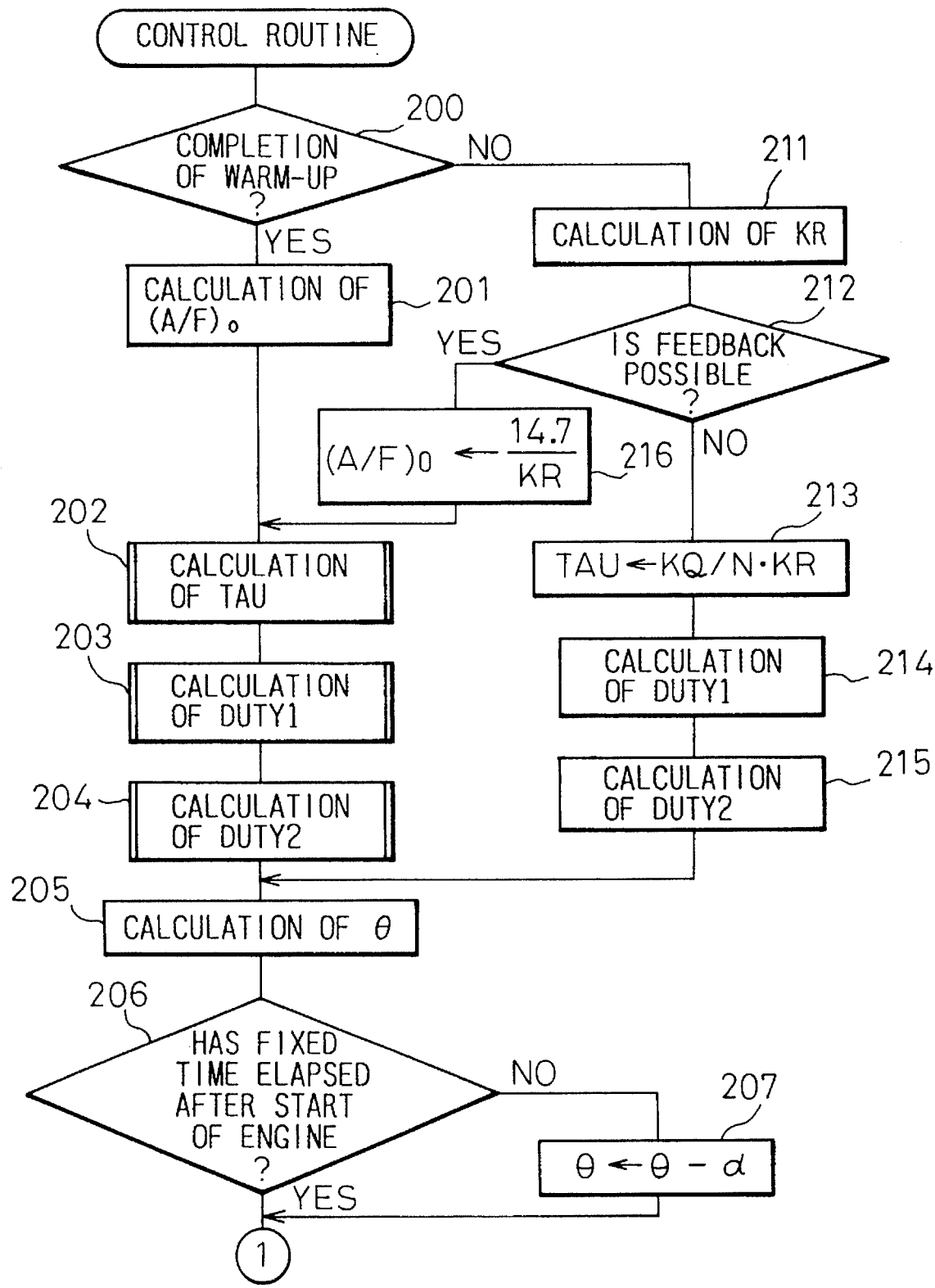
FIGS. 21A and 21B are flow charts of the control routine of the engine.
Figure 21B:
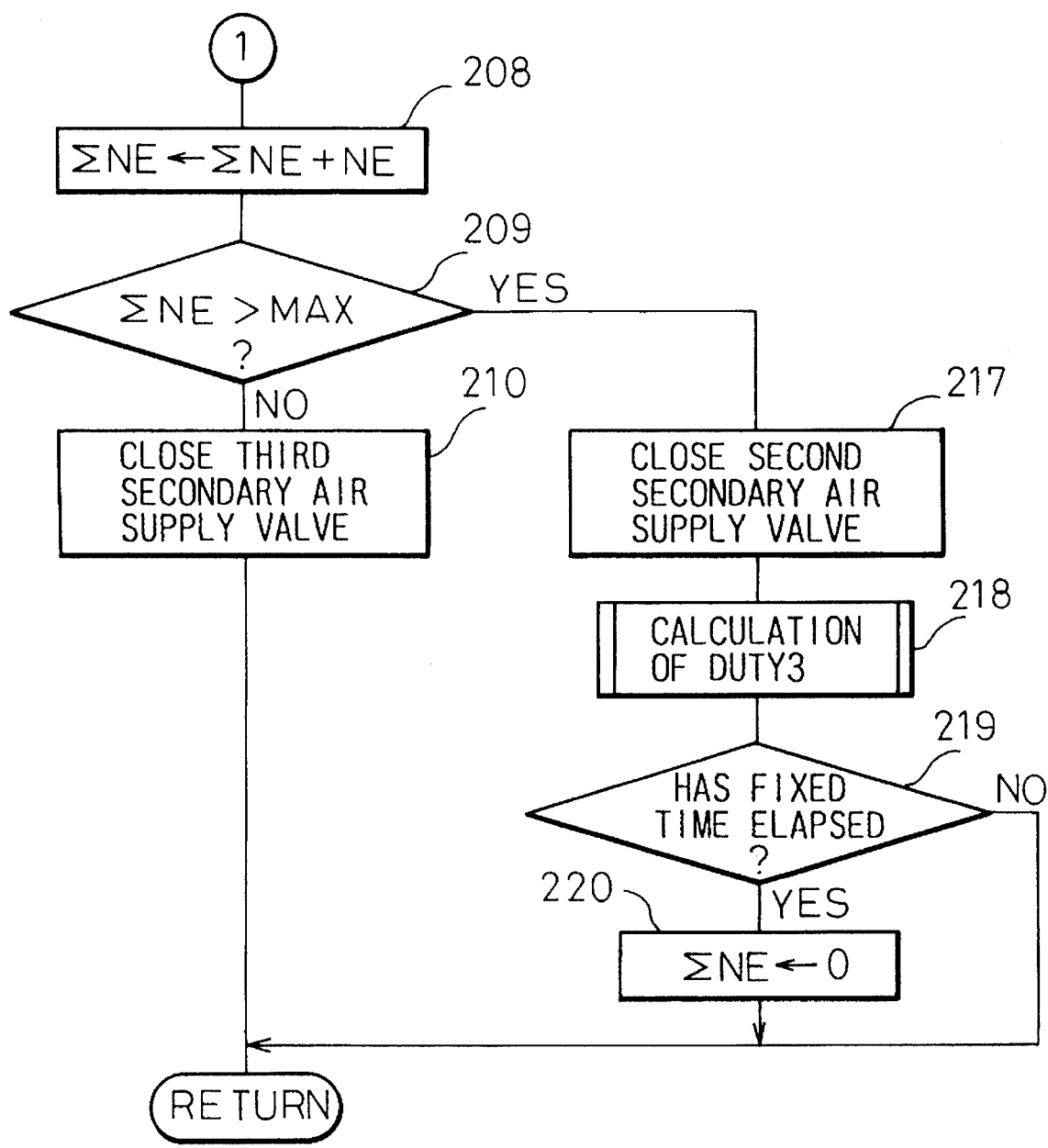

Referring to FIGS. 21A and 21B, at step 200, it is determined based on, for example, the temperature of the engine coolant whether or not the warm-up of the engine is completed. If the warm-up of the engine has been completed, the routine goes to step 201, and the target air-fuel ratio $(A/F)_0$ is calculated. This target air-fuel ratio $(A/F)_0$, as shown in FIG. 16A, is a function of the engine load Q/N (mass flow amount Q of intake air/engine speed N) and the engine speed N. Next, at step 202, the fuel injection time TAU is calculated. The calculation routine of this fuel injection time TAU is shown in FIG. 22.

Figure 22:
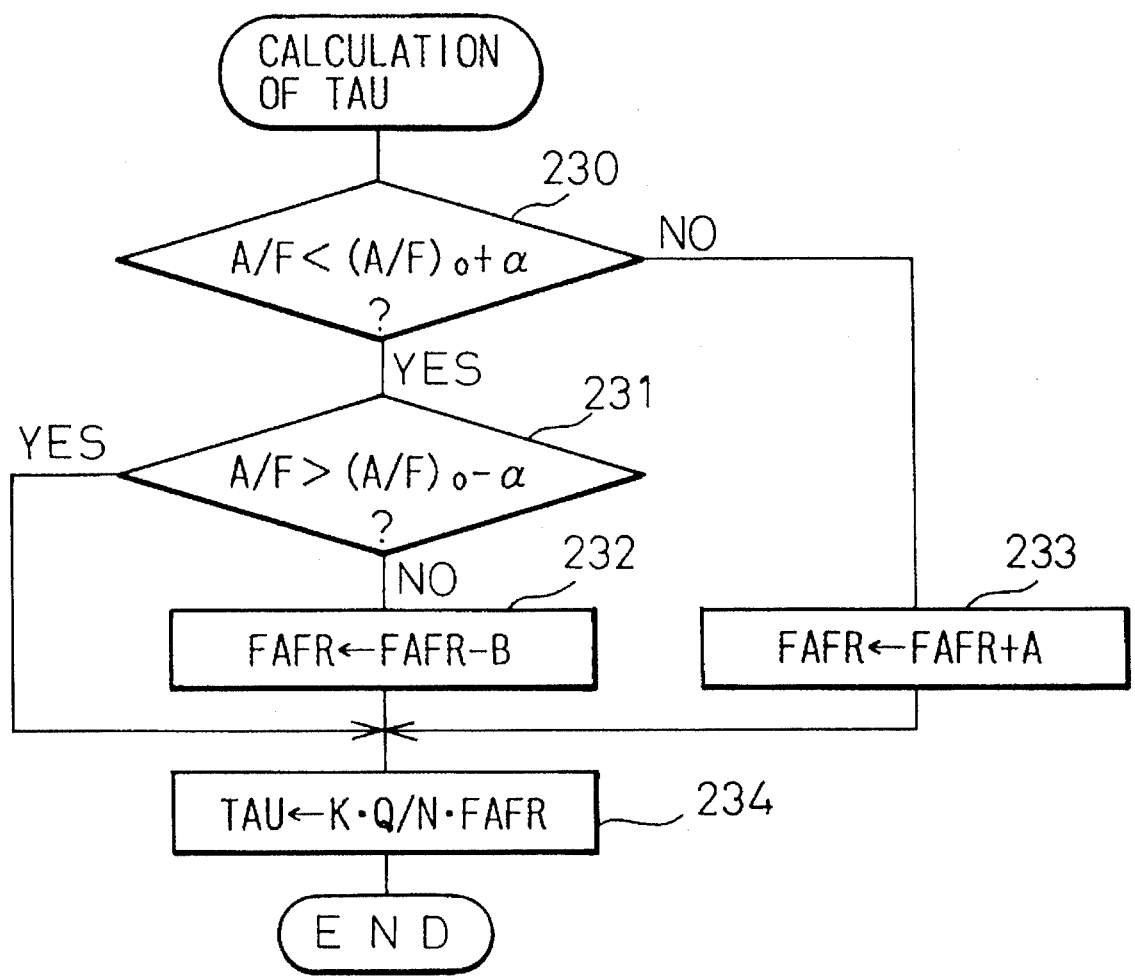
FIG. 22 is a flow chart for calculating the fuel injection time TAU.

Referring to FIG. 22, at step 230, it is determined whether or not the air-fuel ratio of exhaust gas A/F detected by the first air-fuel ratio sensor 32 is smaller than $(A/F)_0+\alpha$. When $A/F \geq (A/F)_0+\alpha$, the routine goes to step 233, and a fixed value A is added to the correction coefficient FAFR. Then, the routine goes to step 234. Conversely, if $A/F<(A/F)_0+\alpha$, the routine goes to step 231, and it is determined whether or not the air-fuel ratio of exhaust gas A/F detected by the first air-fuel ratio sensor 32 is larger than $(A/F)_0-\alpha$. If $A/F \leq (A/F)_0-\alpha$, the routine goes to step 232, and a fixed value B is subtracted from the correction coefficient FAFR. Then, the routine goes to step 234. Conversely, if $A/F>(A/F)_0-\alpha$, the routine goes to step 234.

At step 234, the fuel injection time TAU is calculated based on the following formula.

$$TAU = K \cdot Q/N \cdot FAFR$$

Where, Q represents the mass flow amount of air detected by the mass flow detector 15, and N represents an engine speed. Accordingly, Q/N represents the mass flow amount of air fed into the engine cylinder per one cycle. In addition, K is a constant value and is determined so that, when the amount of injected fuel is made K·Q/N, the air-fuel ratio of the air-fuel mixture fed into the engine cylinders becomes equal to the stoichiometric air-fuel ratio. In other words, K·Q/N represents a basic fuel injection time which is necessary to make the air-fuel ratio of air-fuel mixture the stoichiometric air-fuel ratio, and accordingly, the fuel injection time TAU is found by multiplying the basic fuel injection time K·Q/N by the correction coefficient FAFR.

As can be seen from FIG. 22, if $A/F \geq (A/F)_0+\alpha$, the correction coefficient FAFR is increased and, if $A/F \leq (A/F)_0-\alpha$, the correction coefficient FAFR is decreased. In addition, if $(A/F)_0-\alpha<A/F<(A/F)_0+\alpha$, the correction coefficient FAFR is maintained as it is. Accordingly, the air-fuel ratio A/F of the air-fuel mixture fed into the combustion chamber 3 is maintained between $(A/F)_0-\alpha$ and $(A/F)_0+\alpha$.

Returning to FIGS. 21A and 21B, if the calculation of the fuel injection time TAU is completed at step 202, the routine goes to step 203, and the duty ratio DUTY1 for controlling the first secondary air supply valve 27 is calculated. The calculation routine of this duty ratio DUTY1 is shown in FIG. 23.

Figure 23:
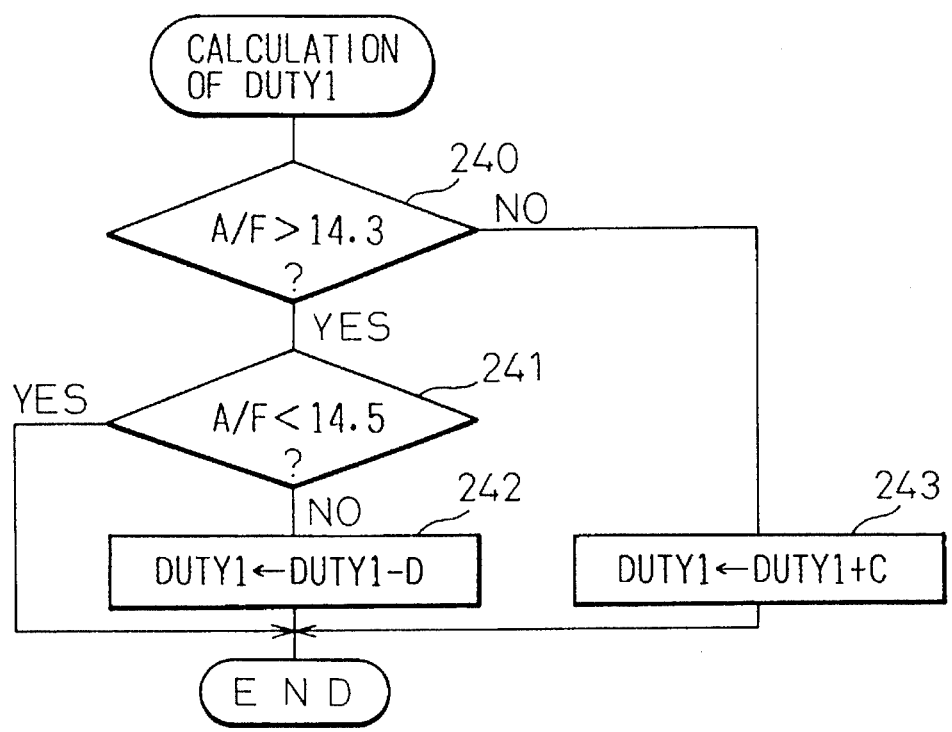
FIG. 23 is a flow chart for calculating the duty ratio DUTY1.

Referring to FIG. 23, at step 240, it is determined whether or not the air-fuel ratio of exhaust gas A/F detected by the second air-fuel ratio sensor 33 is larger than 14.3. If $A/F \leq 14.3$, the routine goes to step 243, and a fixed value C is added to the duty ratio DUTY1. Conversely, if A/F>14.3, the routine goes to step 241. At step 241, it is determined whether or not the air-fuel ratio of exhaust gas A/F detected by the second air-fuel ratio sensor 33 is smaller than 14.5. If $A/F \geq 14.5$, the routine goes to step 242, and a fixed value D is subtracted from the duty ratio DUTY1.

As can be seen from FIG. 23, when $A/F \leq 14.3$, the duty ratio DUTY1 is increased, and thereby the amount of secondary air fed into the exhaust manifold 16 from the first secondary air supply valve 27 is increased. Conversely, when $A/F \geq 14.5$, the duty ratio DUTY1 is decreased, and thereby the amount of secondary air fed into the exhaust manifold 16 from the first secondary air supply valve 27 is reduced. In addition, when 14.3<A/F<14.5, the duty ratio DUTY1 is maintained as it is. Thus, the air-fuel ratio A/F of the exhaust gas flowing into the three way catalyst 17 is maintained between 14.3 and 14.5.

Next, at step 204, the duty ratio DUTY2 for controlling the second secondary air supply valve 28 is calculated. The calculation routine of this duty ratio DUTY2 is shown in FIG. 24.

Figure 24:
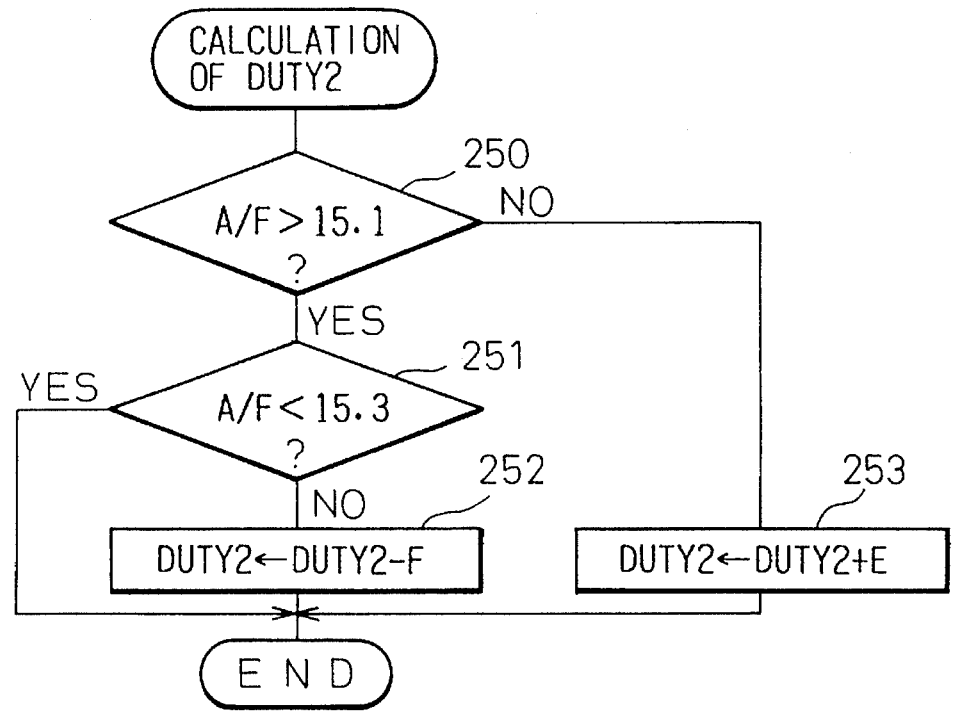
FIG. 24 is a flow chart for calculating the duty ratio DUTY2.

Referring to FIG. 24, at step 250, it is determined whether or not the air-fuel ratio of exhaust gas A/F detected by the third air-fuel ratio sensor 34 is larger than 15.1. If $A/F \leq 15.1$, the routine goes to step 253, and a fixed value E is added to the duty ratio DUTY2. Conversely, if A/F>15.1, the routine goes to step 251. At step 251, it is determined whether or not the air-fuel ratio of exhaust gas A/F detected by the third air-fuel ratio sensor 34 is smaller than 15.3. If $A/F \geq 15.3$, the routine goes to step 252, and a fixed value F is subtracted from the duty ratio DUTY2.

As can be seen from FIG. 24, when $A/F \leq 15.1$, the duty ratio DUTY2 is increased, and thereby the amount of the secondary air fed into the exhaust pipe 19 from the second secondary air supply valve 28 is increased. Conversely, when $A/F \geq 15.3$, the duty ratio DUTY2 is decreased, and thereby the amount of secondary air fed into the exhaust pipe 19 from the second secondary air supply valve 28 is reduced. In addition, when 15.1<A/F<15.3, the duty ratio DUTY2 is maintained as it is. Thus, the air-fuel ratio A/F of the exhaust gas flowing into the oxidizing catalyst 20 and the NOx absorbents 23, 24 is maintained between 15.1 and 15.3.

Returning to FIG. 21A and 21B, if the duty ratio DUTY2 is calculated at step 204, the routine goes to step 205, and the ignition time θ is calculated from the map shown in FIG. 16B. Then, at step 206, it is determined whether or not a fixed time has elapsed after the engine is started. If the fixed time has elapsed after the engine is started, the routine proceeds to step 208. Conversely, if the fixed time has not elapsed yet after the engine is started, the routine goes to step 207, where the ignition time θ is retarded by α, then the routine proceeds to step 208.

At step 208, the current engine speed NE is added to ΣNE. Accordingly, this ΣNE represents the cumulative value of the engine speed NE, and this cumulative value ΣNE is stored in the back up RAM 45. Then, at step 209, it is determined whether or not the cumulative value ΣNE of the engine speed NE reaches the upper limit value MAX. If ΣNE≦MAX, it is thought that the absorbing ability of NOx of the NOx absorbents 23, 24 is not saturated and, at this time, the routine goes to step 210 in which the third secondary air supply valve 29 is closed. Then, the processing cycle is completed.

When it is determined at step 200 that the warm-up of the engine is not completed, the routine goes to step 211, and the correction coefficient KR for the basic fuel injection time K·Q/N is calculated. This correction coefficient KR is a function of, for example, the temperature Tw of the cooling water of the engine and is increased as the temperature Tw of the cooling water of the engine becomes low, as illustrated in FIG. 17A.

Then, at step 212, it is determined if feedback control by the air-fuel ratio sensors 32, 33, and 34 has become possible. If feedback control by the air-fuel ratio sensors 32, 33, and 34 has not become possible, the routine proceeds to step 213, where the fuel injection time TAU is calculated by multiplying the basic fuel injection time K·Q/N by the correction coefficient KR. At this time, the air-fuel ratio A/F of the air-fuel mixture fed into the combustion chamber 3 is made a rich air-fuel ratio corresponding to the value of the correction coefficient KR.

Then, at step 214, the duty ratio DUTY1 for controlling the first secondary air supply valve 27 is calculated. This duty ratio DUTY1 is a duty ratio which is necessary to bring the air-fuel ratio A/F of the exhaust gas flowing into the three way catalyst 17 to from about 14.3 to about 14.5. This duty ratio DUTY1 is stored in advance in the ROM 42 in the form of a map as illustrated in FIG. 17B as a function of, for example, the mass flow amount Q of air and the correction coefficient KR.

Then, at step 215, the duty ratio DUTY2 for controlling the second secondary air supply valve 28 is calculated. This duty ratio DUTY2 is a duty ratio which is necessary to bring the air-fuel ratio A/F of the exhaust gas flowing into the oxidizing catalyst 20 and the NOx absorbents 23, 24 to from about 15.1 to about 15.3. This duty ratio DUTY2 is stored in advance in the ROM 42 in the form of a map as illustrated in FIG. 17B as a function of, for example, the mass flow amount Q of air and the correction coefficient KR, or as a function of only the mass flow amount Q of air.

When it is determined at step 212 that the feedback control by the air-fuel ratio sensors 32, 33, and 34 is possible, the routine goes to step 216, and the target air-fuel ratio $(A/F)_0$ is calculated by dividing the 14.7 by KR. Next, the routine proceeds to step 202. Accordingly, even when before the completion of engine warmup, when feedback control becomes possible, feedback control of the fuel injection time and the amount of the secondary air is performed.

When it is determined at step 209 that ΣNE>MAX, i.e., when the absorbing ability of NOx of the NOx absorbents 23, 24 approaches the saturated state, the routine goes to step 217, land the second secondary air supply valve 28 is closed. As a result, the air-fuel ratio A/F of the exhaust gas flowing into the NOx absorbents 23, 24 becomes rich, and thus the releasing operation of NOx from the NOx absorbents 23, 24 is started. Then, the routine goes to step 218, and the duty ratio DUTY3 for controlling the third secondary air supply valve 29 is calculated. The calculation routine of this duty ratio DUTY3 is shown in FIG. 25.

Figure 25:
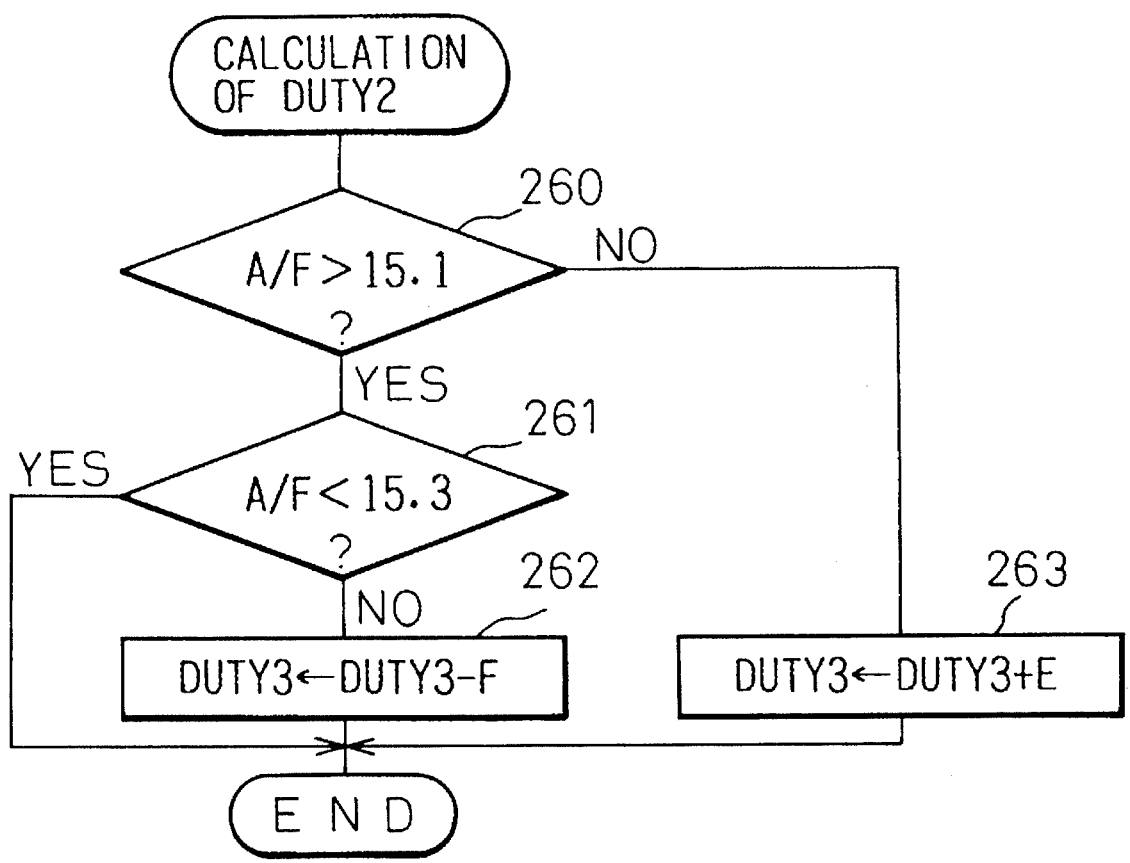
FIG. 25 is a flow chart for calculating the duty ratio DUTY3.

Referring to FIG. 25, at step 260, it is determined whether or not the air-fuel ratio of exhaust gas A/F detected by the third air-fuel ratio sensor 34 is larger than 15.1. If A/F≦15.1, the routine goes to step 263, and a fixed value E is added to the duty ratio DUTY3. Conversely, if A/F>15.1, the routine goes to step 261. At step 261, it is determined whether or not the air-fuel ratio of exhaust gas A/F detected by the third air-fuel ratio sensor 34 is smaller than 15.3. If A/F≧15.3, the routine goes to step 262, and a fixed value F is subtracted from the duty ratio DUTY3.

As can been seen from FIG. 25, when A/F≦15.1, the duty ratio DUTY3 is increased, and thereby the amount of secondary air fed into the exhaust pipe 22 from the third secondary air supply valve 29 is increased. Conversely, when A/F≧15.3, the duty ratio DUTY3 is decreased, and thereby the amount of secondary air fed into the exhaust pipe 22 from the third secondary air supply valve 29 is reduced. In addition, when 15.1<A/F<15.3, the duty ratio DUTY3 is maintained as it is. Thus, the air-fuel ratio A/F of the exhaust gas flowing into the oxidizing catalyst 20 is maintained between 15.1 and 15.3.

Returning to FIGS. 21A and 21B, if the duty ratio DUTY3 is calculated at step 218, the routine goes to step 219, and it is determined whether or not a fixed time has elapsed after the releasing operation of NOx is started. When a fixed time has elapsed after the releasing operation of NOx is started, i.e., when all NOx is released from the NOx absorbents 23, 24, the routine goes to step 220, and ΣNE is made zero. Then, the processing cycle is completed. In the next processing cycle, the control of the supply of secondary air by the second secondary air supply valve 28 is started again.

Note that in all of the above embodiments, feedback control was performed so that the air-fuel ratio of the air-fuel mixture burned in the combustion chamber 3 became the target air-fuel ratio $(A/F)_0$ when feedback control by the first air-fuel ratio sensor 32 became possible. In this case, however, it is also possible not to provide the first air-fuel ratio sensor 32 and perform feedback control of the air-fuel ratio so that the air-fuel ratio of the air-fuel mixture becomes the target air-fuel ratio $(A/F)_0$.

According to the present invention, the amount of NOx discharged into the outside air can be reduced to almost zero.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purification device of an engine, comprising:

air-fuel mixture control means for making an air-fuel mixture burned in a combustion chamber of the engine a rich air-fuel mixture;

a three way catalyst arranged in an exhaust passage of the engine;

a NOx absorbent arranged in said exhaust passage downstream of said three way catalyst, said NOx absorbent absorbing NOx therein when an air-fuel ratio of exhaust gas flowing into said NOx absorbent is lean;

first secondary air supply means for feeding secondary air into said exhaust passage upstream of said three way catalyst;

second secondary air supply means for feeding secondary air into said exhaust passage between said three way catalyst and said NOx absorbent; and secondary air control means for controlling amounts of secondary air fed from said first secondary air supply means and said second secondary air supply means to maintain the air-fuel ratio of the exhaust gas flowing into said three way catalyst at a rich air-fuel ratio which is larger than an air-fuel ratio of said first mentioned rich air-fuel mixture and to maintain the air-fuel ratio of the exhaust gas flowing into said NOx absorbent at a lean air-fuel ratio.

2. An exhaust gas purification device according to claim 1, wherein an air-fuel ratio of the exhaust gas flowing into the three way catalyst is somewhat smaller than the stoichiometric air-fuel ratio.

3. An exhaust gas purification device according to claim 2, wherein an air-fuel ratio of the exhaust gas flowing into the three way catalyst is between about 14.3 and about 14.5.

4. An exhaust gas purification device according to claim 2, wherein said first secondary air supply means comprises a secondary air inlet which is open to said exhaust passage, and said secondary air control means comprises an air-fuel ratio sensor arranged in said exhaust passage downstream of said secondary air inlet and upstream of said three way catalyst and controls the amount of secondary air fed from said first secondary air supply means on the basis of an output signal of said air-fuel ratio sensor to maintain the air-fuel ratio of the exhaust gas flowing into said three way catalyst at a target rich air-fuel ratio.

5. An exhaust gas purification device according to claim 1, wherein an air-fuel ratio of said rich air-fuel mixture is slightly smaller than the air-fuel ratio of the exhaust gas flowing into the three way catalyst.

6. An exhaust gas purification device according to claim 5, wherein said air-fuel ratio of the sair rich air-fuel mixture is between about 14.0 and about 14.2.

7. An exhaust gas purification device according to claim 5, wherein said first secondary air supply means comprises a secondary air inlet which is open to said exhaust passage, and said secondary air control means comprises an air-fuel ratio sensor arranged in said exhaust passage upstream of said secondary air inlet and controls the air-fuel mixture burned in said combustion chamber on the basis of an output signal of said air-fuel ratio sensor to make an air-fuel ratio of the air-fuel mixture burned in said combustion chamber a target rich air-fuel ratio.

8. An exhaust gas purification device according to claim 1, wherein said air-fuel ratio of the exhaust gas flowing into said NOx absorbent is slightly larger than the stoichiometric air-fuel ratio.

9. An exhaust gas purification device according to claim 8, wherein said air-fuel ratio of the exhaust gas flowing into said NOx absorbent is between about 15.1 and about 15.3.

10. An exhaust gas purification device according to claim 8, wherein said second secondary air supply means comprises a secondary air inlet which is open to said exhaust passage, and said secondary air control means comprises an air-fuel ratio sensor arranged in said exhaust passage downstream of said secondary air inlet and controls the amount of secondary air fed from said second secondary air supply means on the basis of an output signal of said air-fuel ratio sensor to maintain the air-fuel ratio of the exhaust gas flowing into said NOx absorbent at a target lean air-fuel ratio.

11. An exhaust gas purification device according to claim 1, wherein said air-fuel mixture control means controls the richness of the air-fuel mixture burned in the combustion chamber in accordance with the engine operating state.

12. An exhaust gas purification device according to claim 1, wherein said air-fuel mixture control means increases the richness of the air-fuel mixture burned in the combustion chamber when a warm-up operation is carried out.

13. An exhaust gas purification device according to claim 12, wherein the richness is increased more the lower the engine coolant temperature.

14. An exhaust gas purification device according to claim 12, wherein the said secondary air control means is provided with an air-fuel ratio sensor disposed in the exhaust passage, the first secondary air supply means and the second secondary air supply means are provided with a first secondary air supply valve and a second secondary air supply valve, respectively, and the secondary air control means controls the area of the opening of the first secondary air supply valve and the area of the opening of the second secondary air supply valve to predetermined areas of opening in accordance with said richness in the period up until feedback control based on the output signal of the air-fuel ratio sensor becomes possible.

15. An exhaust gas purification device according to claim 1, wherein ignition time control means is provided for controlling an ignition time to retard said ignition time for a predetermined time after the engine is started.

16. An exhaust gas purification device according to claim 1, wherein said three way catalyst is an electrically heated catalyst and is electrically heated at least when the engine is started.

17. An exhaust gas purification device according to claim 1, wherein said NOx absorbent comprises a first absorbent and a second absorbent arranged downstream of said first absorbent, and said first absorbent and said second absorbent have a different region of temperature at which an absorption rate of NOx becomes maximum.

18. An exhaust gas purification device according to claim 17, wherein the region of temperature of said first absorbent is on the lower temperature side as compared with that of said second absorbent.

19. An exhaust gas purification device according to claim 1, wherein said second secondary air supply means comprises a secondary air inlet which is open to said exhaust passage, and an oxidizing catalyst is arranged in said exhaust passage between said secondary air inlet and said NOx absorbent, said secondary air control means controlling the amount of secondary air fed from said secondary air supply means to maintain the air-fuel ratio of the exhaust gas flowing into said oxidizing catalyst and said NOx absorbent at a lean air-fuel ratio.

20. An exhaust gas purification device according to claim 19, wherein said three way catalyst is an electrically heated catalyst and is electrically heated at least when the engine is started.

21. An exhaust gas purification device according to claim 1, wherein an oxidizing catalyst is arranged in said exhaust passage downstream of said NOx absorbent.

22. An exhaust gas purification device according to claim 21, wherein said three way catalyst is an electrically heated catalyst and is electrically heated at least when the engine is started.

23. An exhaust gas purification device according to claim 21, wherein said NOx absorbent releases absorbed NOx when the air-fuel ratio of the exhaust gas flowing into said NOx absorbent is made rich, and a third secondary air supply means is provided for feeding secondary air into said exhaust passage between said NOx absorbent and said oxidizing catalyst, said secondary air control means temporarily stopping a supply of secondary air fed from said second secondary air supply means to make the air-fuel ratio of the exhaust gas flowing into said NOx absorbent a rich air-fuel ratio when NOx is to be released from said NOx absorbent, said secondary air control means controlling a feeding operation of secondary air fed from said third secondary air supply means and temporarily carrying out said feeding operation of secondary air to make the air-fuel ratio of exhaust gas flowing into said oxidizing catalyst a lean air-fuel ratio when NOx is to be released from said NOx absorbent.

24. An exhaust gas purification device according to claim 23, wherein said third secondary air supply means comprises a secondary air inlet which is open to said exhaust passage, and said secondary air control means comprises an air-fuel ratio sensor arranged in said exhaust passage downstream of said secondary air inlet and controls the amount of secondary air fed from said third secondary air supply means on the basis of an output signal of said air-fuel ratio sensor to maintain the air-fuel ratio of the exhaust gas flowing into said oxidizing catalyst at a target lean air-fuel ratio.

25. An exhaust gas purification device according to claim 24, wherein said target lean air-fuel ratio is bteween about 15.1 to about 15.3.

\* \* \* \* \*

UNITED STATES PATENT AND TRADEMARK OFFICE
CERTIFICATE OF CORRECTION

PATENT NO. : 5,551,231
DATED : September 3, 1996
INVENTOR(S) : Hiroshi TANAKA, et al.

It is certified that error appears in the above-indentified patent and that said Letters Patent is hereby corrected as shown below:

Column 8, line 28, change "close to to" to --close to the--.

Column 9, line 61, change "33, 33, and 34" to --32, 33, and 34--.

Column 10, line 64, change "operationn" to --operation--.

Column 12, line 57, delete "to" before "from".

Column 12, line 66, delete "to" before "from".

Column 14, line 37, change "$O_2^-$ on $O^{2-}$" to --$O_2^-$ or $O^{2-}$--.

Column 16, line 55, change "back up" to --back-up--.

Column 17, line 16, delete "to" before "from".

Column 17, line 25, delete "to" before "from".

Column 17, line 36, change "warmup" to --warm-up--.

Column 17, line 42, change "land" to --and--.

UNITED STATES PATENT AND TRADEMARK OFFICE
CERTIFICATE OF CORRECTION

PATENT NO. : 5,551,231
DATED : September 3, 1996
INVENTOR(S) : Hiroshi TANAKA, et al.

It is certified that error appears in the above-indentified patent and that said Letters Patent is hereby corrected as shown below:

Column 19, line 9, change "sair" to --said--.

Column 19, line 45, change "more the lower" to --more to lower--.

Column 20, line 63, change "to" to --and--.

Column 20, line 62, change "bteween" to --between--.

Signed and Sealed this

Twenty-ninth Day of April, 1997

BRUCE LEHMAN

*Attest:*

*Attesting Officer*       Commissioner of Patents and Trademarks